United States Patent
Horigami et al.

(10) Patent No.: US 6,251,012 B1
(45) Date of Patent: Jun. 26, 2001

(54) GAME SYSTEM AND STORAGE DEVICE READABLE BY COMPUTER

(75) Inventors: Atsushi Horigami; Riichiro Kawahara, both of Tokyo-to; Mariko Koyama, Yokohama; Kenhei Gu, Tokyo-to; Atsushi Otani, Tokyo-to; Hidehiro Hirata, Tokyo-to; Makoto Yabe, Tokyo-to; Kazuhiko Kobari, Tokyo-to, all of (JP)

(73) Assignee: Konami Co., Ltd., Hyogo-ken (JP)

( * ) Notice: Subject to any disclaimer, the term of this patent is extended or adjusted under 35 U.S.C. 154(b) by 0 days.

(21) Appl. No.: 09/164,547

(22) Filed: Oct. 1, 1998

(30) Foreign Application Priority Data

Oct. 3, 1997 (JP) .................................................. 9-271757

(51) Int. Cl.$^7$ ...................................................... A63R 9/22
(52) U.S. Cl. .................................. 463/7; 463/23; 463/30; 463/1; 273/148 B
(58) Field of Search ........................... 463/30–34, 36–39, 463/40–44, 7, 8, 14, 15; 273/148 B

(56) References Cited

U.S. PATENT DOCUMENTS

| | | |
|---|---|---|
| 5,267,734 | 12/1993 | Stamper et al. . |
| 5,491,777 | 2/1996 | Mase et al. . |
| 5,572,646 * | 11/1996 | Kawai et al. .......................... 463/31 |
| 5,971,855 * | 10/1999 | Ng ......................................... 463/43 |
| 6,165,068 * | 12/2000 | Sonoda et al. ........................ 463/40 |

FOREIGN PATENT DOCUMENTS

| | | |
|---|---|---|
| 09140938 | 3/1997 | (EP) . |
| 0768105 | 4/1997 | (EP) . |

OTHER PUBLICATIONS

Dec. 1994 Coming Soon Magazine, Virtual LIF SIM From Mindscape www.Mindscape.com.*
Dyer A: "Creatures" Personal Computer World, GB, London, p. 96 XP002048353 *left–hand column, paragraph 3*.

Jeff Gerstmann: "Monster Rancher" 'Online!, Jan. 27, 1998, pp. 1–2, XP002124499 Retrieved from the Internet: <URL:videogames.gamespot.com/psx/strsim/monsterr/review.htm]>' retrieved on Dec. 1, 1999! *the whole document*.

* cited by examiner

Primary Examiner—Jessica J. Harrison
Assistant Examiner—Sheila Clayton
(74) Attorney, Agent, or Firm—Jordan and Hamburg LLP

(57) ABSTRACT

The game system comprises an image display device; an operation input device issuing a signal corresponding to an operation of a player; a mode select device for selecting one mode between a breeding mode in which a breeding game is prepared and a competition mode in which a competition game is prepared; a breeding game control device for controlling a progress of the breeding game, and a competition game control device. The breeding game is controlled in such a manner that a breeding game image representing a scene in which a game character is bred in accordance with a breeding operation of the player performed to the operation input device is displayed on a screen of the image display device, and that data defining a feature of the game character is changed in accordance with a predetermined condition, and the competition game is controlled in such a manner that a competition game image representing a scene of a competition in which at least one piece given to each of the player and an opponent thereto takes an action on a predetermined play field at each turn which is alternately given to the player and the opponent is displayed on the screen of the image display device, and that superiority and inferiority of the competition are changed based on both a detail of the action at each turn and data defining a property of said at least one piece. The data defining the feature of the game character and the data defining the property of said at least one piece of the player are associated with each other.

15 Claims, 28 Drawing Sheets

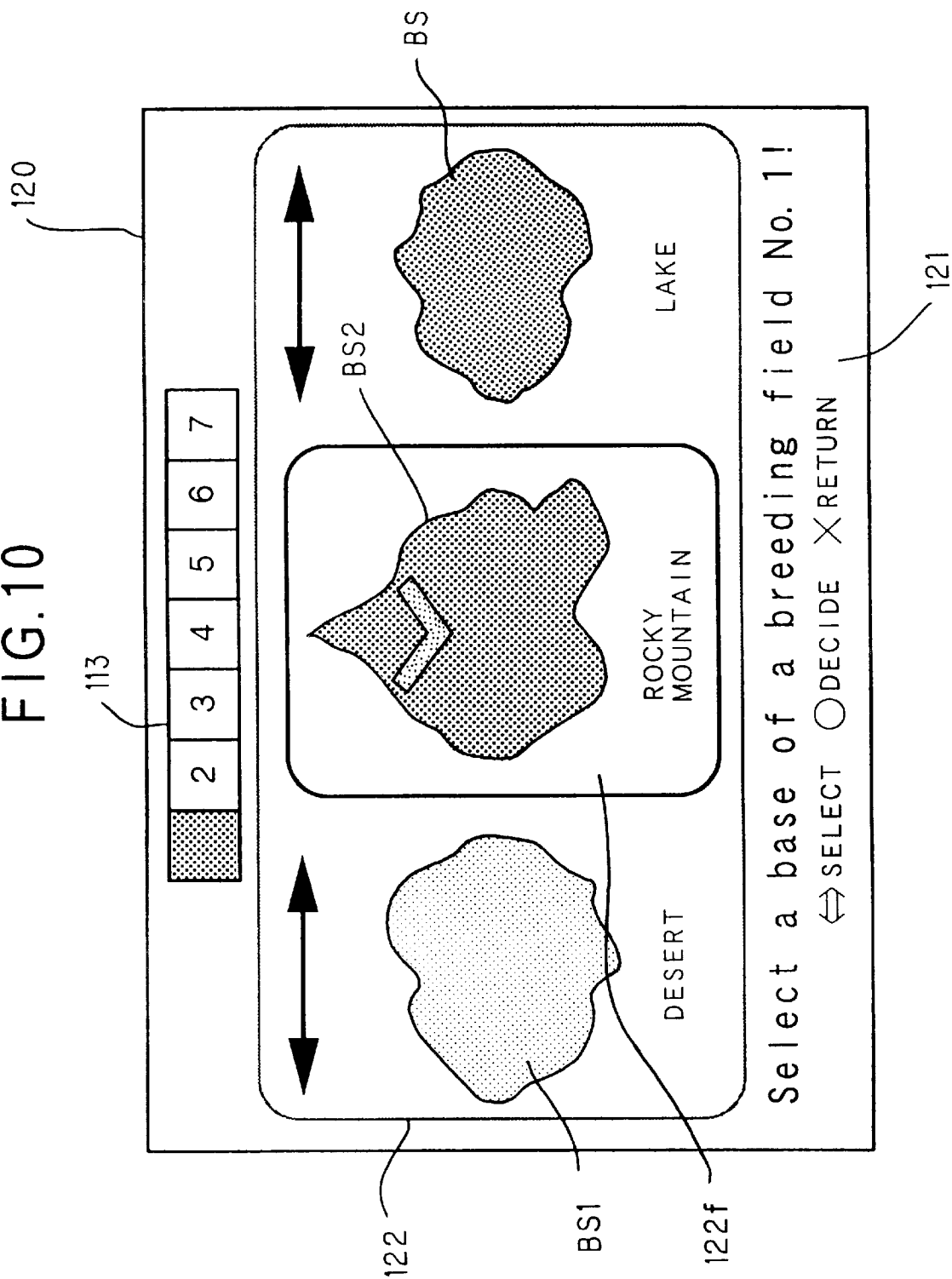

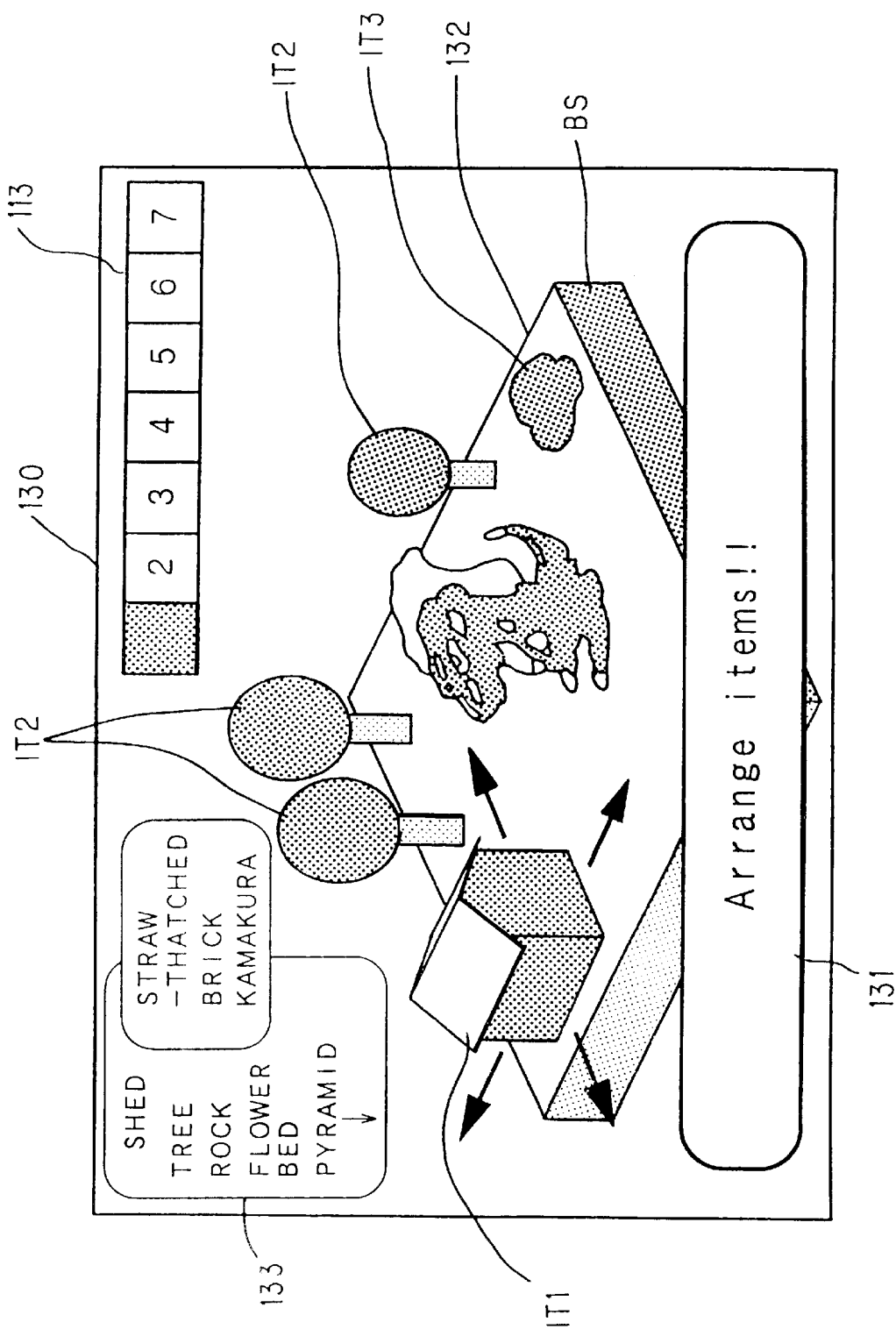

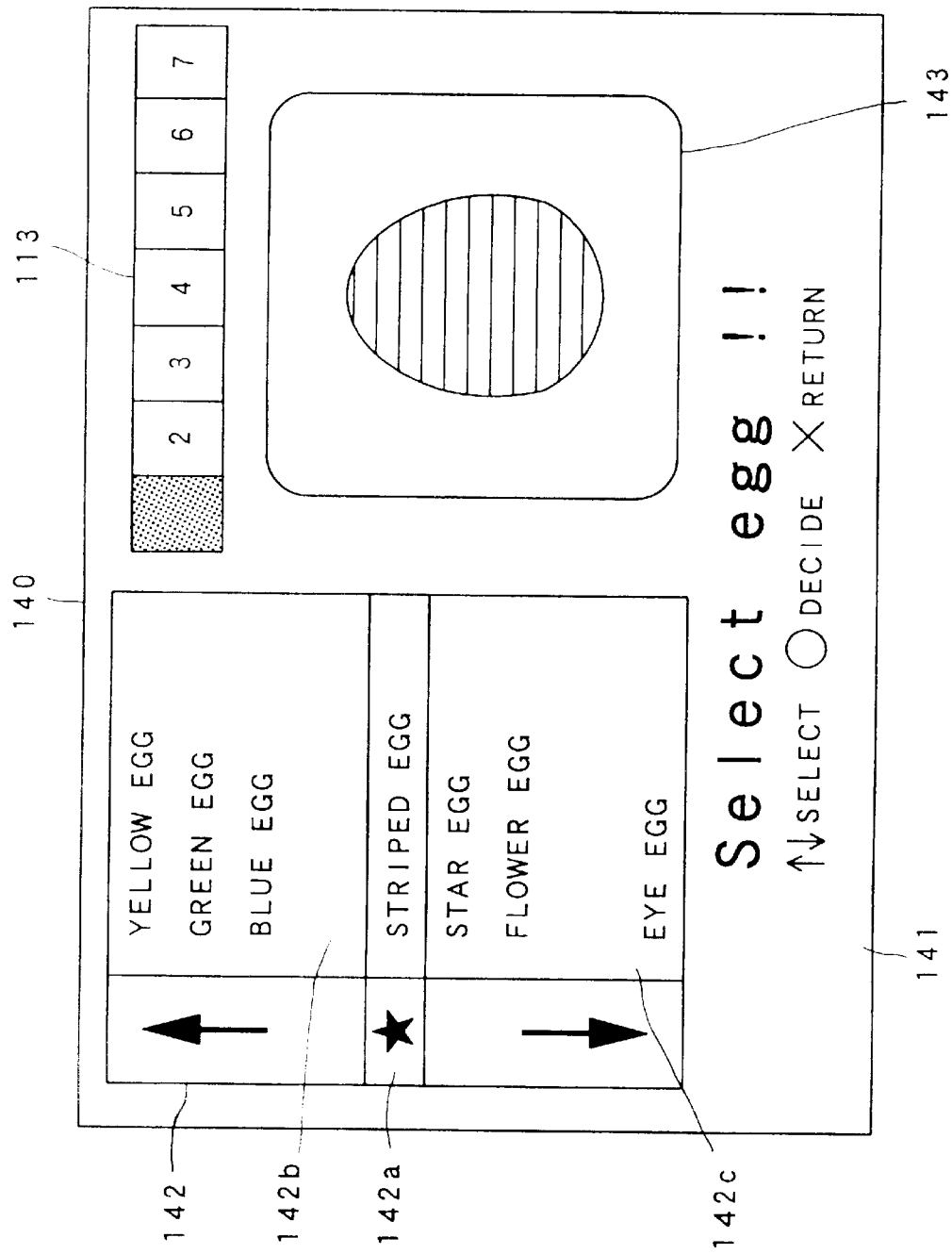

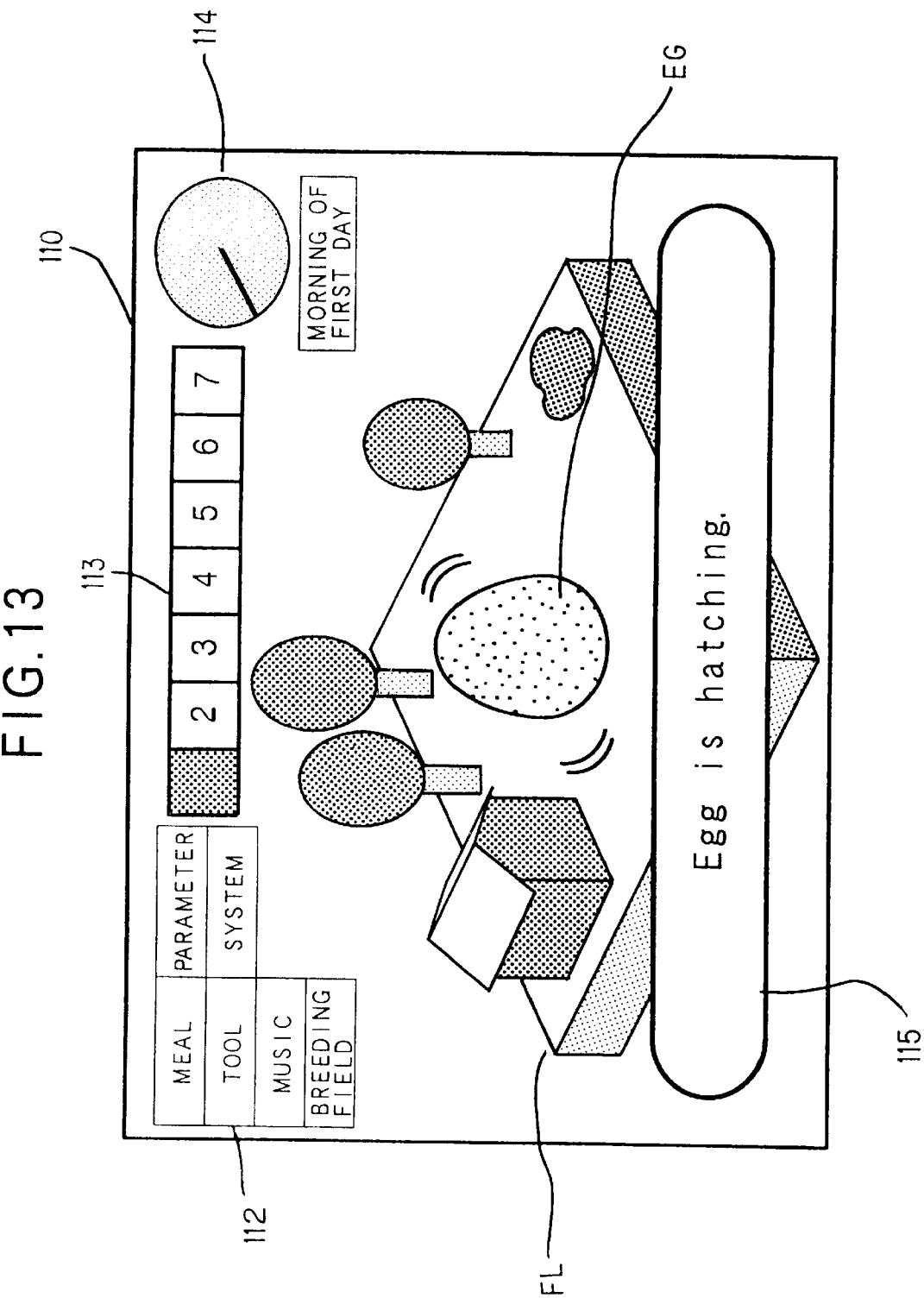

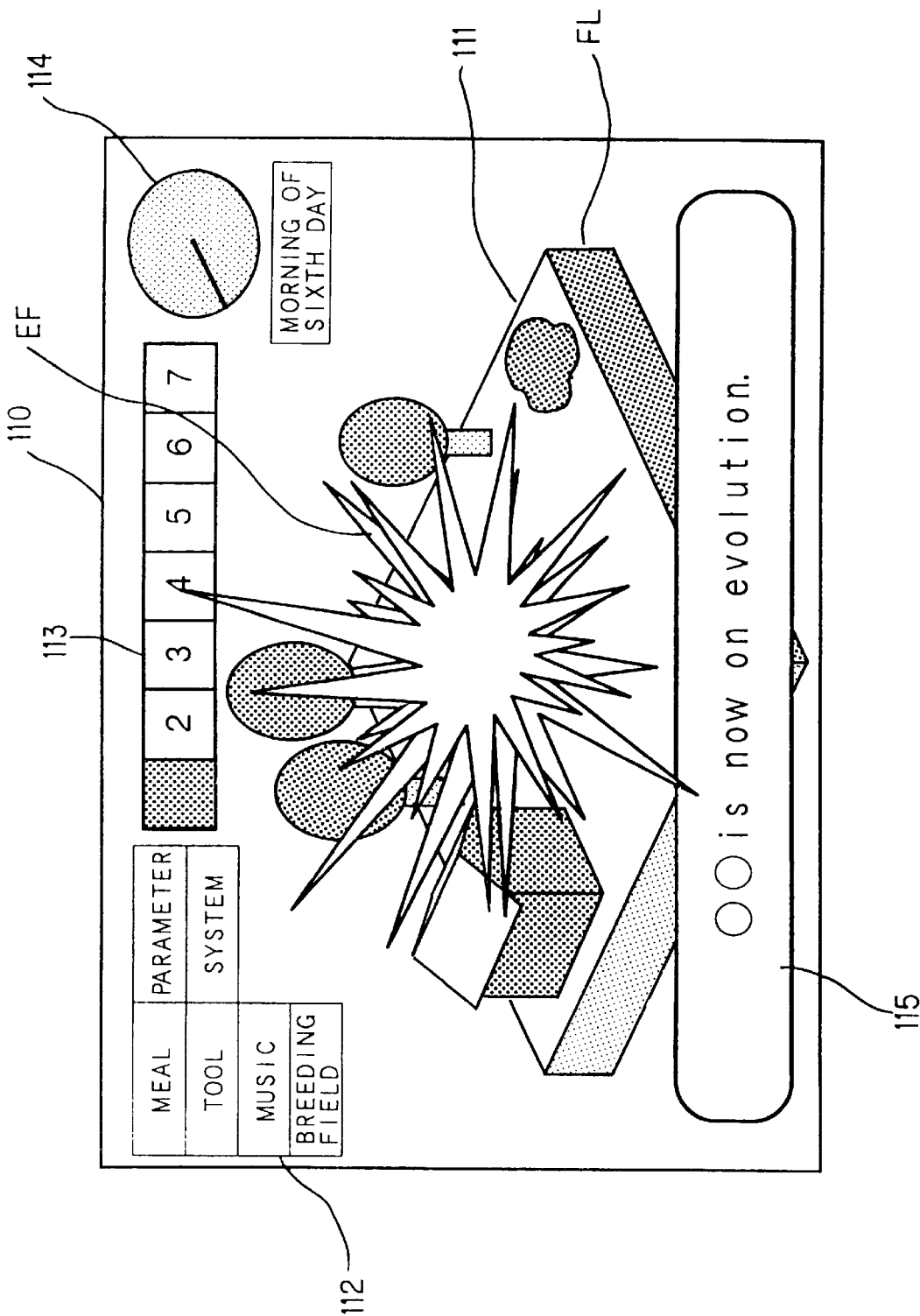

FIG. 28
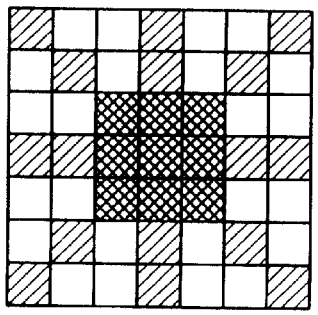
Q TYPE
MOVE FRONT, BACK, RIGHT, AND LEFT ALSO IN DIAGONAL DIRECTIONS
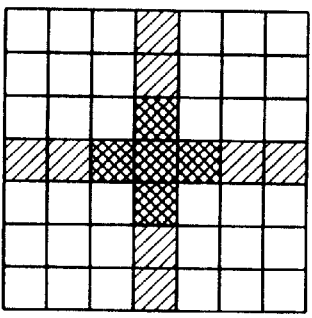
R TYPE
MOVE FRONT, BACK, RIGHT, AND LEFT
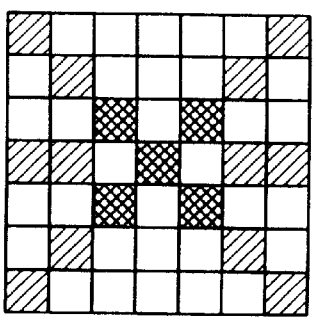
B TYPE
MOVE IN DIAGONAL DIRECTIONS

GAME SYSTEM AND STORAGE DEVICE READABLE BY COMPUTER

BACKGROUND OF THE INVENTION

The present invention relates to a game system using a computer.

In a conventional computer game system for playing a board game such as chess, shogi (Japanese chess) or the like, a property of each piece which is given to the player (for example a movable range, strength or the like) is determined in advance, and the player cannot optionally set the property thereof. Accordingly, the game of this type tends to be monotonous.

As an improvement with regard to this point, there is known a game system in which the player scrambles for the piece and competes to enlarge his territory in a certain play field as in the case of the chess game, each piece disposed in the play field representing a character modeled on a human or the like, and ability of the piece, such as strength, a movable range or the like and an appearance thereof are changed in accordance with the degree of experience of the competition in the game.

However in the above mentioned game system, since the ability of the piece is improved only through the competition, the player has to repeatedly try the competition from an early step at which the ability of the piece is relatively low. Therefore, the player is compelled to play inconvenient and unsatisfying competitions until the ability of the piece is improved to a certain degree, so that the player cannot enjoy the game sufficiently at the arly stages thereof.

SUMMARY OF THE INVENTION

One of objects of the present invention is to provide a game system in which the player can optionally set a property of the piece and enjoy a process to prepare the piece.

In order to attain the above object, there is provided a game system comprising:

an image display device;

an operation input device capable of issuing a signal corresponding to an operation of a player;

a mode select device for selecting one mode between a breeding mode in which a breeding game is prepared and a competition mode in which a competition game is prepared in accordance with an instruction of the player inputted through the operation input device;

a breeding game control device for controlling a progress of the breeding game in such a manner that a breeding game image representing a scene in which a game character is bred in accordance with a breeding operation of the player performed to the operation input device is displayed on a screen of the image display device, and that data defining a feature of the game character is changed in accordance with a predetermined condition; and a competition game control device for controlling a progress of the competition game in such a manner that a competition game image representing a scene of a competition in which at least one piece given to each of the player and an opponent thereto takes an action on a predetermined play field at each turn which is alternately given to the player and the opponent is displayed on the screen of the image display device, and that superiority and inferiority of the competition are changed based on both a detail of the action at each turn and data defining a property of said at least one piece; wherein the data defining the feature of the game character and the data defining the property of said at least one piece of the player are associated with each other.

According to the above game system, it is possible to provide the player with two ways of enjoying the game, one of which is pleasure of breeding the game character, and the other of which is pleasure of performing the competition in the competition game. Since the property of the piece used by the player in the competition game and the feature of the game character bred by the player in the breeding game are associated with each other, the player can set the desirable property of the piece with enjoying the breeding game. Therefore, the player need not repeat the competition game at the early stage in which the ability of the piece is relatively low to improve the ability thereof, and can sufficiently enjoy both of the breeding game and the competition game.

The game system of the present invention may further comprise a piece registration device for performing a piece registration process in which the game character bred in the breeding game is registered as said one piece useable in the competition game in accordance with an instruction of the player inputted through the operation input device, said piece registration device may prepare the data which defines the property of said registered one piece based on the data defining the feature of the game character.

In this case, if the player requests the registration of the piece at the stage in which the game character has been bred to the desirable level, the piece which has the property corresponding to the breeding state of the game character at that time is prepared and registered. Accordingly, the progress of the competition game is affected by the timing of the registration, so that a judgement of the player with respect to the timing of the registration may be more effective in the progress of the competition game, thereby improving the interest of the game.

A plurality of pieces may be provided as said at least one piece, at least one of the pieces registered through the piece registration process can be changed so as to be disabled from being selected by the player in the competition game in accordance with the progress of the competition game after being registered, and the game system may further comprise a piece information indication device for providing the player with information associated with the pieces having experience of being registered selectively in accordance with the operation of the player.

In this case, the player can watch the information of the piece through the piece information indication device, even if an incident occurred in the game after the registration of the piece, for example a loss in the competition, causes the player to be prohibited from selecting the piece. Therefore, it is possible to provide the player with a different type of pleasure of competing with another player to increase the number of the pieces which have experiences of being registered and to search an unknown piece, as well as the pleasure in breeding and competition.

The piece information indication device may display an appearance of the game character, which has experience of being registered as one of the pieces, as the information associated with the pieces on the screen of the image display device.

The game system may further comprise; a plurality of portable auxiliary storage devices; and a data recording device capable of recording data which defines the property of said at least one piece on each of the portable auxiliary storage devices in accordance with signals inputted through the operation input device, and the competition game control device may read out the data recorded on each of the auxiliary storage devices, and set the property of said at least one piece given to each of the player and the opponent based on the data read out from each of the auxiliary storage devices. In this case, two or more players can simultaneously enjoy the competition game with gathering their pieces prepared through the breeding game.

The breeding game control device may set a breeding environment as a factor affecting the feature of the game character in accordance with a setting operation performed by the player to the operation input device, display the breeding game image in such a manner that an image corresponding to the breeding environment appears therein, and prepare the data defining the feature of the game character in accordance with the predetermined condition which is adjusted in association with the breeding environment.

In this case, since the player can set up the breeding environment of the monster along his desire, and the image corresponding to the prepared breeding environment appears in the breeding game image, it is possible to enhance interest of the breeding game.

The breeding game control device may change the breeding environment in accordance with a changing command issued from the player through the operation input device after a beginning of a breeding of the game character. In this case, the degree of freedom with respect to the breeding increases, so that the player can breed the more desirable game character.

A plurality of images of breeding fields may be prepared to represent the image corresponding to the breeding environment, and the breeding game control device may display the breeding game image in such a manner that one of the breeding field images corresponding to the breeding environment appears therein together with an image of the game character.

The breeding game control device may set a breeding environment based on both of base information and item information, each of which is adjusted in accordance with instructions of the player inputted through the operation input device, and display an image of a breeding field as the image corresponding to the breeding environment, the image of the breeding environment may comprise a configuration determined in association with a base information and an item determined in association with the item information and arranged on the configuration.

The breeding game control device can simultaneously set plural breeding environments in accordance with respective setting operations performed by the player to the operation input device, and can display images of breeding fields corresponding to the respective breeding environments, each of the images of the breeding fields may be displayed with an image of the game character bred therein, the breeding game control device may prepare the data which defines the feature of the game character in accordance with the predetermined condition, and the condition may be adjusted in such a manner that each of the breeding environments affects the feature of the game character displayed in each of the images of the breeding fields.

The breeding game control device may display on the screen of the image display device a scene in which at least two images of the breeding fields are combined with each other in accordance with a combination request of the player inputted through the operation input device, and may adjust the data which defines the feature of the game character associated with each of said at least two images of the breeding fields in accordance with the predetermined condition, and the condition may be adjusted in such a manner that the feature of the game character is affected by combination of the breeding fields.

The breeding game control device may display, on the screen of the image display device, a scene in which said at least two images of the breeding fields are separated from each other in accordance with a separation request of the player inputted through the operation input device, and may adjust the data which defines the feature of the game character associated with each of said at least two images of the breeding fields in accordance with the predetermined condition, and the condition may be adjusted in such a manner that the feature of the game character is affected by separation of the breeding fields.

The breeding game control device may display, on the screen of the image display device, a scene in which the game character evolves when it is judged that a predetermined evolution time has come based on lapsed time in the breeding game, and may adjust the data of the game character in accordance with the predetermined condition which is affected by a detail of an evolution of the game character.

The competition game control device may form an image of the play field so as to include a plurality of squares arranged to form a series thereof, at least one of the squares may have a configuration different from configurations of other squares, and the competition game control device may control the progress of the competition game in such a manner that at least one of the action and the superiority and inferiority of the competition is affected with the configuration of each of the squares. In this case, if the action of the piece is affected with the configuration of each of the squares, then the decision of the superiority and inferiority of the competition may be affected with a change of the action after all. The configuration may affect only the decision with respect to the superiority and inferiority of the competition.

According to another aspect of the present invention, there is provided a data storage device readable by a computer which stores a game program prepared for causing the computer to execute steps of:

one mode between a breeding mode in which a breeding game is prepared and a competition mode in which a competition game is prepared in accordance with an instruction of the player;

controlling a progress of the breeding game in such a manner that a breeding game image representing a scene in which a game character is bred in accordance with a breeding operation of the player is displayed, and that data defining a feature of the game character is changed in accordance with a predetermined condition;

controlling a progress of the competition game in such a manner that a competition game image representing a scene of a competition in which at least one piece given to each of the player and an opponent thereto takes an action on a predetermined play field at each turn which is alternately given to the player and the opponent is displayed, and that superiority and inferiority of the competition are changed based on both a detail of the action at each turn and data defining a property of said at least one piece; and associating the data defining the feature of the game character and the data defining the property of said at least one piece of the player with each other.

In the present invention, the feature of the game character may include various elements by which the game character is distinguished from the other character in the breeding game, such as an appearance, a name, a state of breeding (for example, degree of age, intelligence, physical strength, personality if in the case that the game character is modeled on a living thing) and so forth. Similarly, the property of the piece may include various elements by which the piece is distinguished form the other piece in the competition game, such as an appearance, a name, ability of action and so forth. The relationship between the feature of the game character and the property of the piece may be set in various manners. For example, the relationship may set in such a manner that the strength of the piece increases as the breeding state of the game character corresponding thereto is improved. The breeding state may have a peak thereof, and the strength of the piece may decrease if the game character corresponding thereto has been bred to exceed the peak of the breeding state.

Still further objects, features and other aspect of the present invention will be understood from the following detailed description of the preferred embodiments of the present invention with reference to the accompanying drawings.

BREIF DESCRIPTION OF THE DRAWINGS

FIG. 10 is a diagram illustrating a base select image displayed in the process of FIG. 9;

FIG. 11 is a diagram illustrating an optional item select image displayed in the process of FIG. 9;

FIG. 12 is a diagram illustrating an egg select image displayed in the process of FIG. 9;

FIG. 13 is a diagram illustrating a scene of an animation displayed in the process of FIG. 9 to represent incubation of the egg;

FIG. 15 is a diagram illustrating one scene of an animation displayed in the process of FIG. 5 to represent evolution of the monster;

FIG. 28 is a diagram illustrating examples of movable patterns determined in accordance with the property of the piece.

DETAILED DESCRIPTION OF THE PREFERRED EMBODIMENTS

The preferred embodiments of the present invention are explained below with reference to the attached drawings.

Figure 1:
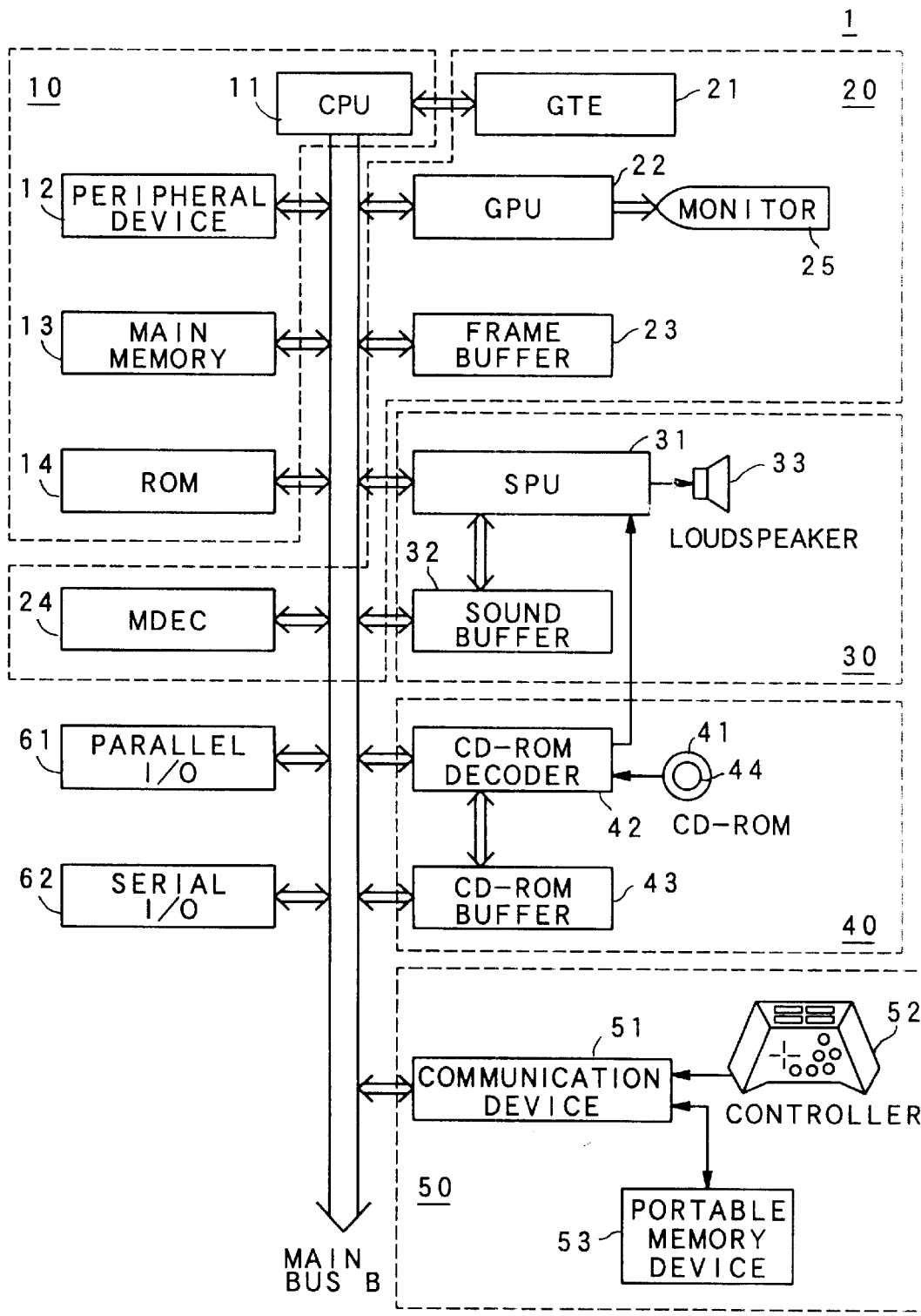
FIG. 1 is a block diagram showing a schematic configuration of a game system according to an embodiment of the present invention.

FIG. 1 shows a schematic configuration of a home-use game system as an embodiment of the present invention. The game system 1 comprises a main control section 10, a graphics control section 20, a sound control section 30, a disk readout section 40, and a communication section 50. These sections are electrically connected to each other through a main bus B. The main control section 10 comprises a CPU 11 which includes a micro processing unit to perform calculations and management of various parts necessary for progress of the game, a peripheral device 12 which controls interruption to the CPU 11 and performs auxiliary control such as memory access management, a main memory 13 provided with an electrically alterable semiconductor storage device such as a RAM, and a ROM 14 which stores a program for controlling basic operation of the game system 1.

The graphics control section 20 comprises a geometry transfer engine (GTE) as a co-processor which performs particular calculations necessary for drawing an image, for example calculations of coordinates of polygons for drawing a three-dimensional image, in response to an order of the CPU 11, a graphics processing unit (GPU) 22 which performs a drawing process in accordance with a drawing order of the CPU 11, a frame buffer 23 which works as means for temporary storing data drawn by the GPU 22, and an image decoder (MDEC) 24 which decodes compressed image data stored in the main memory 13. During the game play, image data recorded in a CD-ROM as a storage device is loaded into the main memory in accordance with necessity, decoded through the MDEC 24, and drawn on the frame buffer 23 through the GPU 22. Then, an appropriate area in the image drawn on the frame buffer 23 is displayed on the screen of a monitor 25 as a display device (for example, a CRT of a home-use television set).

The sound control section 30 comprises a sound processing unit (SPU) 31 which produces sounds, such as effect sounds, B.G.M. and the like in accordance with a request of the CPU 11, a sound buffer 32 as a temporary storage device associated with the SPU 31, and a loudspeaker 33 for reproducing the sounds produced through the SPU 31. The disk readout section 40 comprises a CD-ROM drive 41 which rotatably drives the CD-ROM 44 and readouts programs and data recorded thereon the an optical manner, a CD-ROM decoder 42 which decodes signals readout through the CD-ROM drive 41 in accordance with a predetermined process, and a CD-ROM buffer 43 as a temporary storage device associated with the decoder 42.

The communication section 50 comprises a communication control device 51 which controls communication between the communication section 50 and the CPU 11 through the main bus B, a controller 52 as an operation input device having a plurality of input members such as push buttons to be operated by the player, and a portable card type memory device 53 as an auxiliary storage device including a semiconductor storage device which is alterable and capable of holding data. The controller 52 issues signals corresponding to the state of the input members at a predetermined interval (for example 60 times per second), and the communication control device 51 transmits the signals to the CPU 11. The memory device 53 is detachable from the control device 51. FIG. 1 shows only one set of the controller 52 and the memory device 53, however, the communication control device 51 can be connected with a plurality of the controllers 52 and the memory devices 53. The input members of the controller 52 are assigned to various functions in accordance with the progress of the game and the configuration thereof, respectively.

The game system 1 further comprises a parallel I/O (input/output) port 61 and a serial I/O port 62 to be connected with peripheral devices. The serial port 61 can be connected with another game system through an electrical communication cable (not shown) to advance the game by performing the communication between the two game systems 1, 1.

When the CD-ROM 44, on which a program and data for performing the game according to the present invention are recorded, is set in the disk readout section 40, and a predetermined initializing operation (for example, turning on the power supply or operating a reset switch) is carried out, the CPU 11 performs a game process in accordance with the program recorded on the CD-ROM 44. The summary of the game is as follows; a "monster" is hatched from an "egg" and bred in a breeding field, the bred monster is registered as a "piece", i.e. a game piece, at a desirable time, and the registered piece is used in a battle game, as a competition game, played on a predetermined "play field" similar to the chess game. Hereinafter, the detail of the game process performed by the CPU 11 will be explained.

Figure 2:
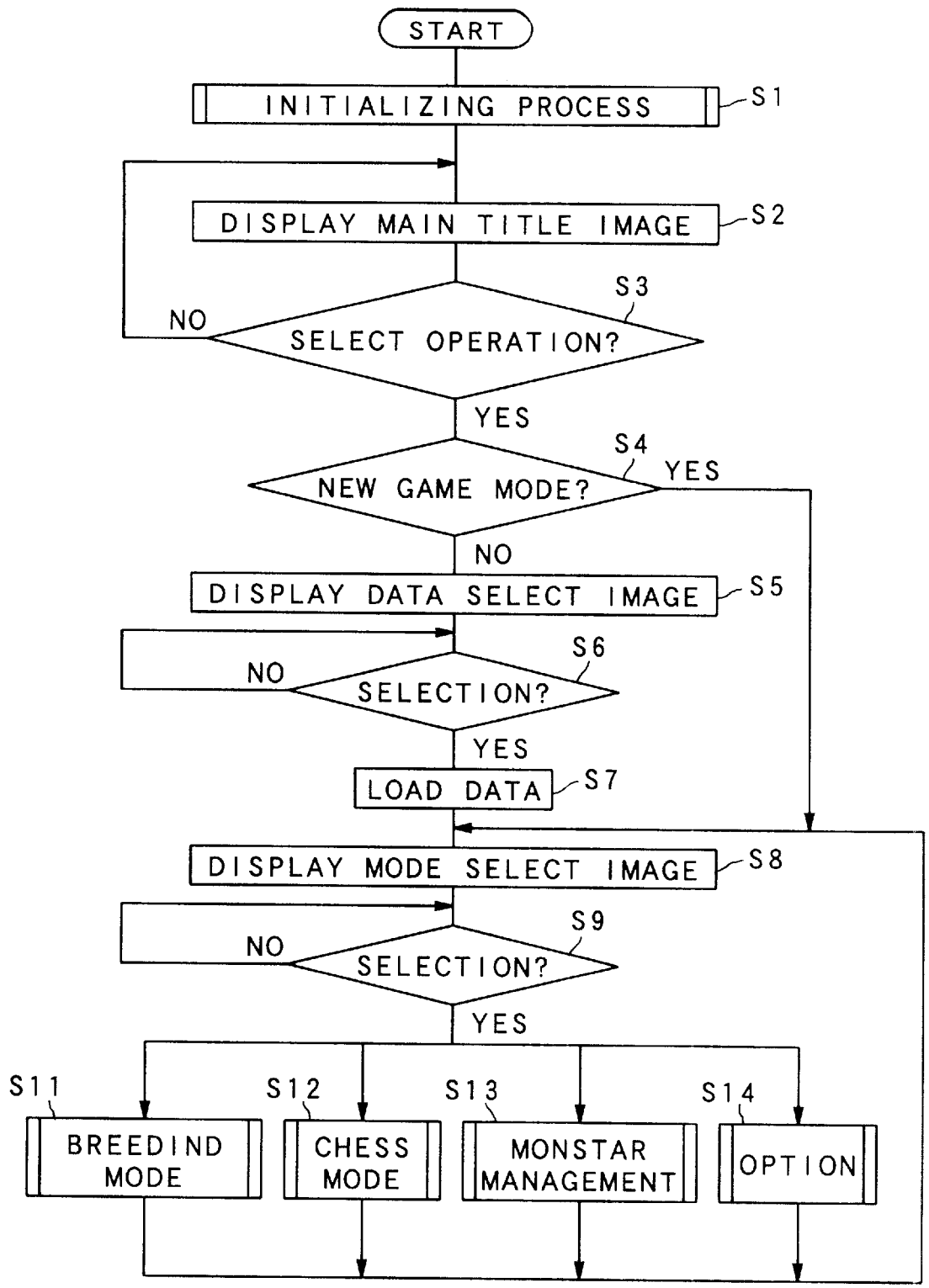
FIG. 2 is a flow chart showing a main routine of a game process performed by the CPU of FIG. 1.
Figure 3:
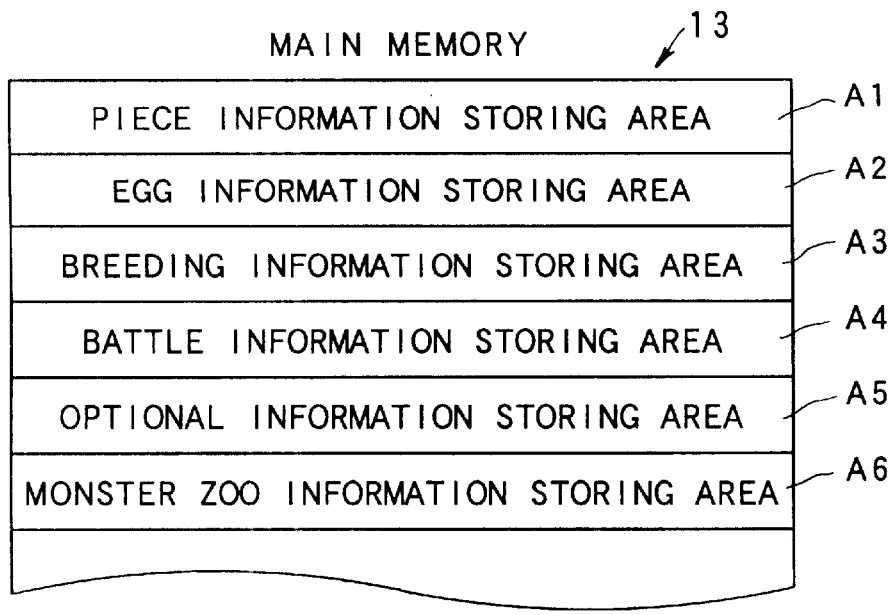
FIG. 3 is a diagram illustrating a main part of a data storage area secured in a main memory during the game play.

FIG. 2 is a flow chart showing a main routine of the game process performed by the CPU 11. When the above mentioned initializing operation is performed, a predetermined start-up process is carried out in accordance with the program stored in the ROM 14 (step S1). At this time, the program recorded on the CD-ROM 44 is loaded into a predetermined area in the main memory 13. Then, as shown in FIG. 3, a piece information storing area A1, an egg information storing area A2, a breeding information storing area A3, a battle information storing area A4, an optional information storing area A5 and a monster zoo information storing area A6 are set therein. The detail of the data stored in each section will be explained later.

After finishing the start-up process, a main title image is displayed on the screen of the monitor 25 (step S2). In the main title image, the player is requested to select a new game mode in which a game is newly started or a continue mode in which the game is continued on the basis of the data stored in the memory device 53. When the player selects the new game mode through the controller 52, the process proceeds to the step S8. When the player selects the continue mode, a predetermined data select image is displayed (steps S3, S4 and S5).

In the data select image, the player is requested to select data stored in the memory device 53. When the player selects desirable data through the controller 52, the selected data is loaded into the main memory 13 from the memory device 53 (steps S6 and S7).

At this time, data for specifying the piece capable of being used in a chess mode is loaded into the above mentioned piece information storing area A1, data for specifying the egg selectable in a breeding mode is loaded into the egg information storing area A2, data for specifying a current breeding state of the monster is loaded into the breeding information storing area A3, data associated with battle, such as records of battle of the player from the past to the present, is loaded into the battle information storing area A4, data for specifying a game setting, such as game speed, degree of difficulty or the like is loaded into the optional information storing area A5, and data for distinguishing an achievement state of a "monster zoo" mentioned later is loaded into the monster zoo information storing area A6, respectively.

Figure 4:
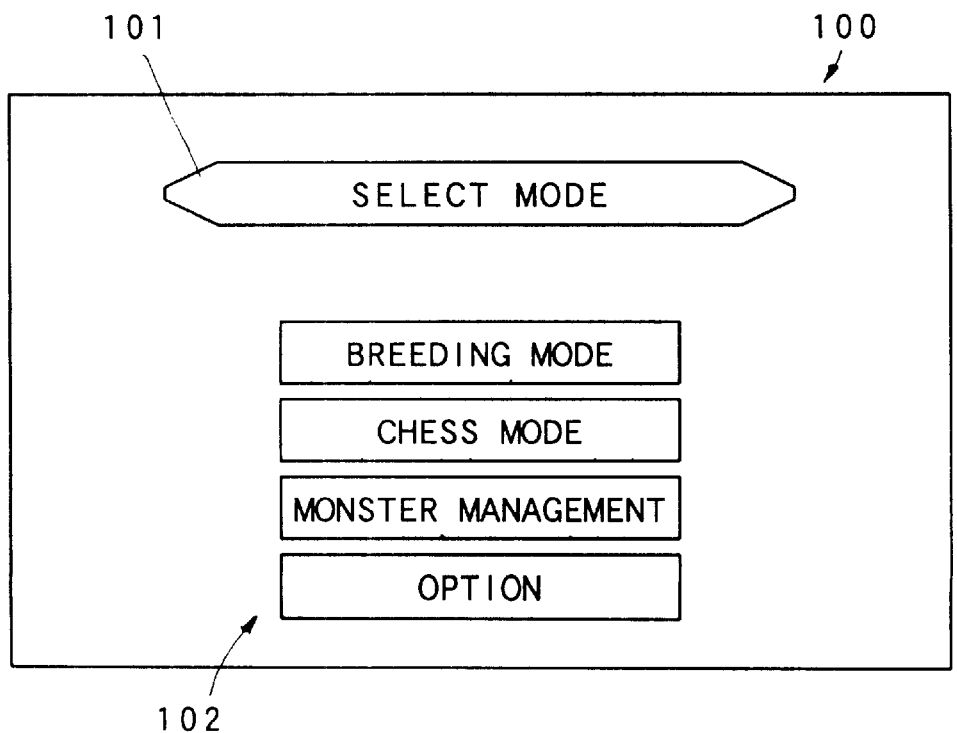
FIG. 4 is a diagram illustrating a mode select image displayed in the process of FIG. 2.

After finishing the data loading, a mode select image 100 illustrated in FIG. 4 is displayed on the screen of the monitor 25 (step S8). The mode select image 100 is provided with a message display section 101 through which the player is requested to select a mode, and a menu display section 102 in which a list of selectable modes is displayed. In the menu display section 102, there are displayed four modes, that is, a "breeding mode", a "chess mode", a "monster management mode" and an "option".

When the player selects one of the four modes through the controller 52, the CPU 11 distinguishes the selected mode (step S9), and performs the sub-routine process corresponding to the selected mode (steps S11 to S14). After finishing the sub-routine process, the process returns to the step S8.

Figure 5:
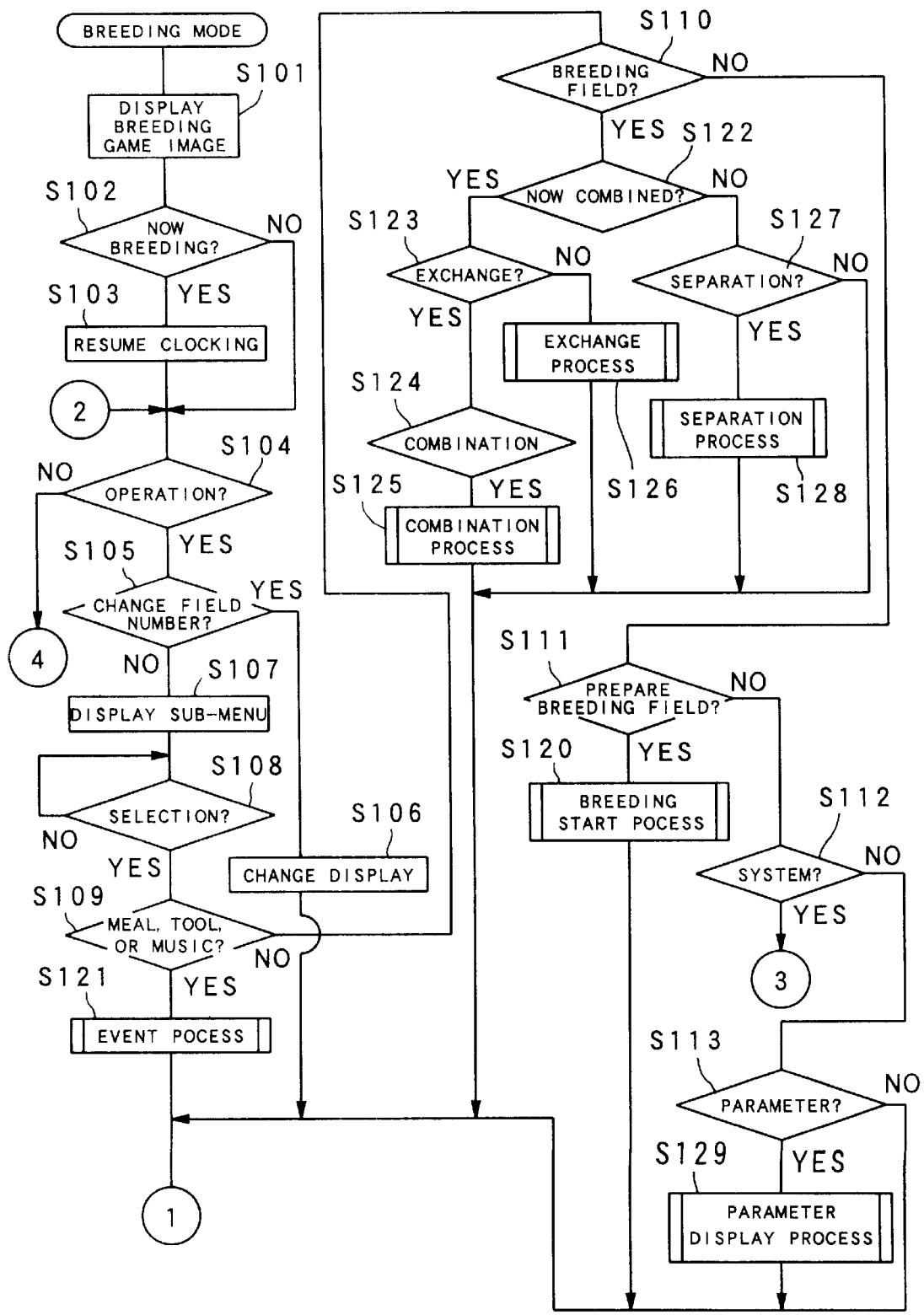
FIG. 5 is a flow chart showing a sub-routine of the game process performed when the breeding mode is selected in the process of FIG. 2.
Figure 6:
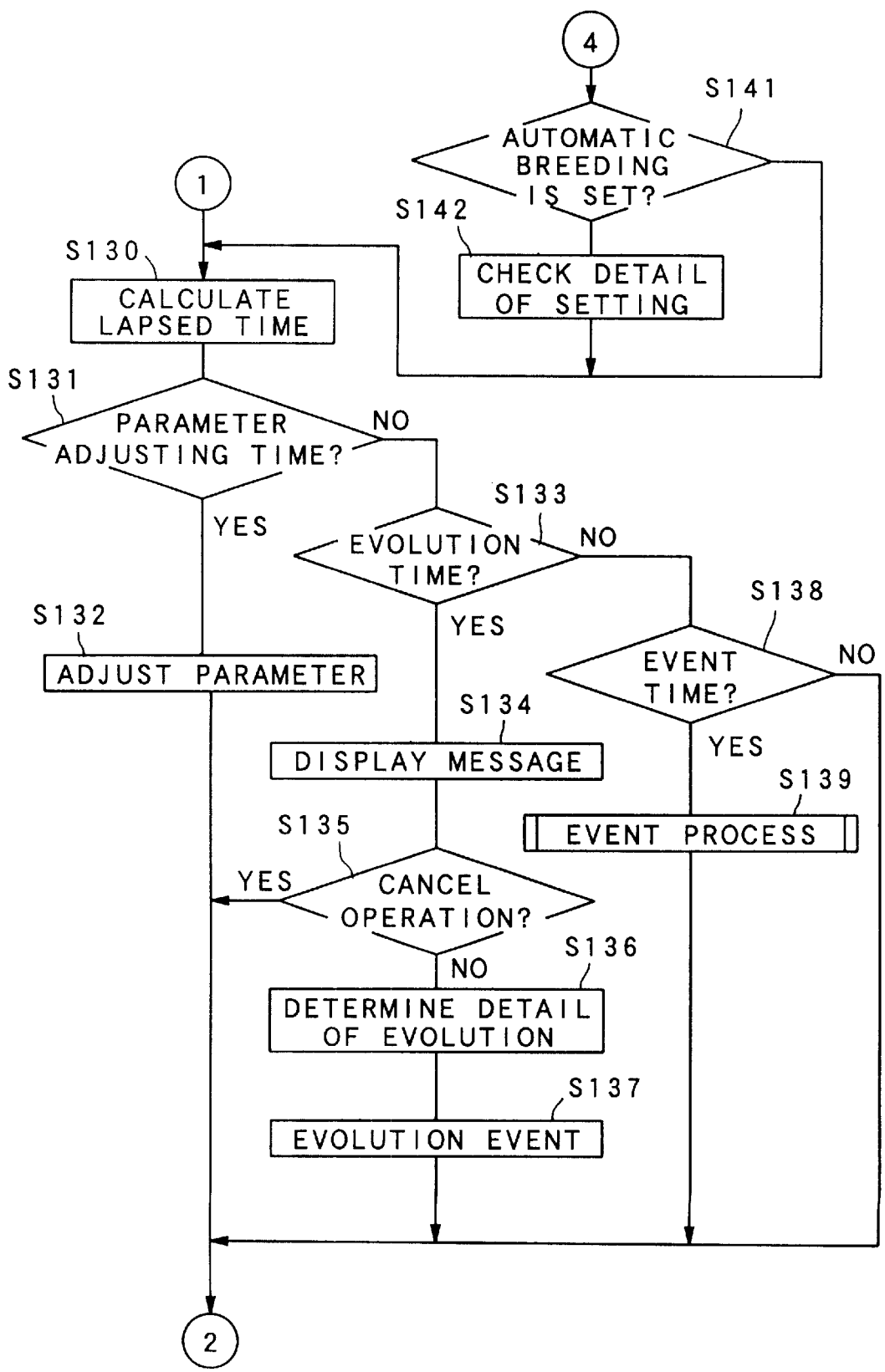
FIG. 6 is a flow chart following that of FIG. 5.
Figure 7:
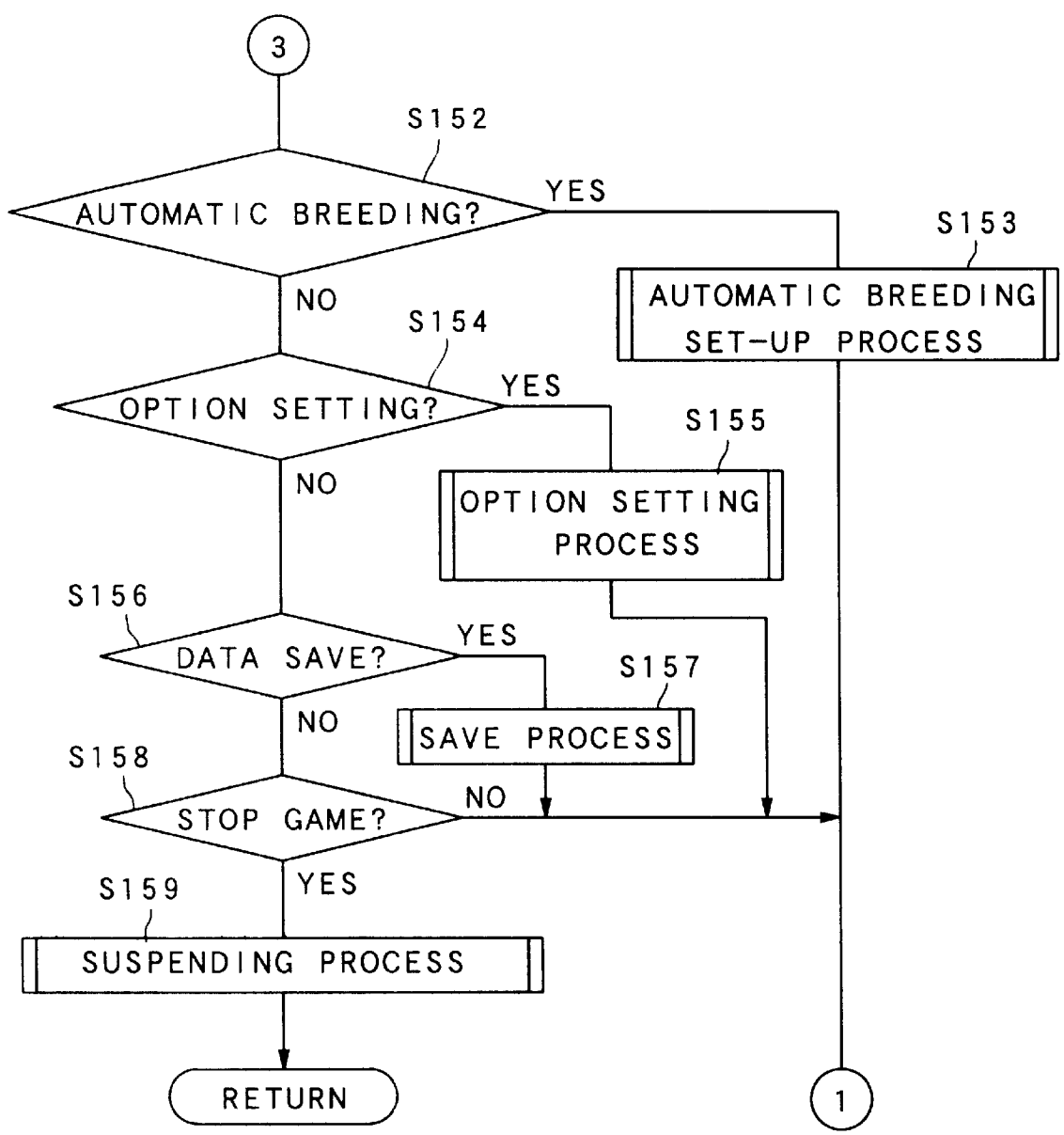
FIG. 7 is a flow chart following that of FIG. 5.

FIGS. 5 to 7 are flow charts showing a sub-routine process performed when the breeding mode is selected. In this process, first of all, a breeding game image is displayed (step S10). The breeding game image is a basic game image in the breeding mode, and an embodiment thereof is illustrated in FIG. 8.

Figure 8:
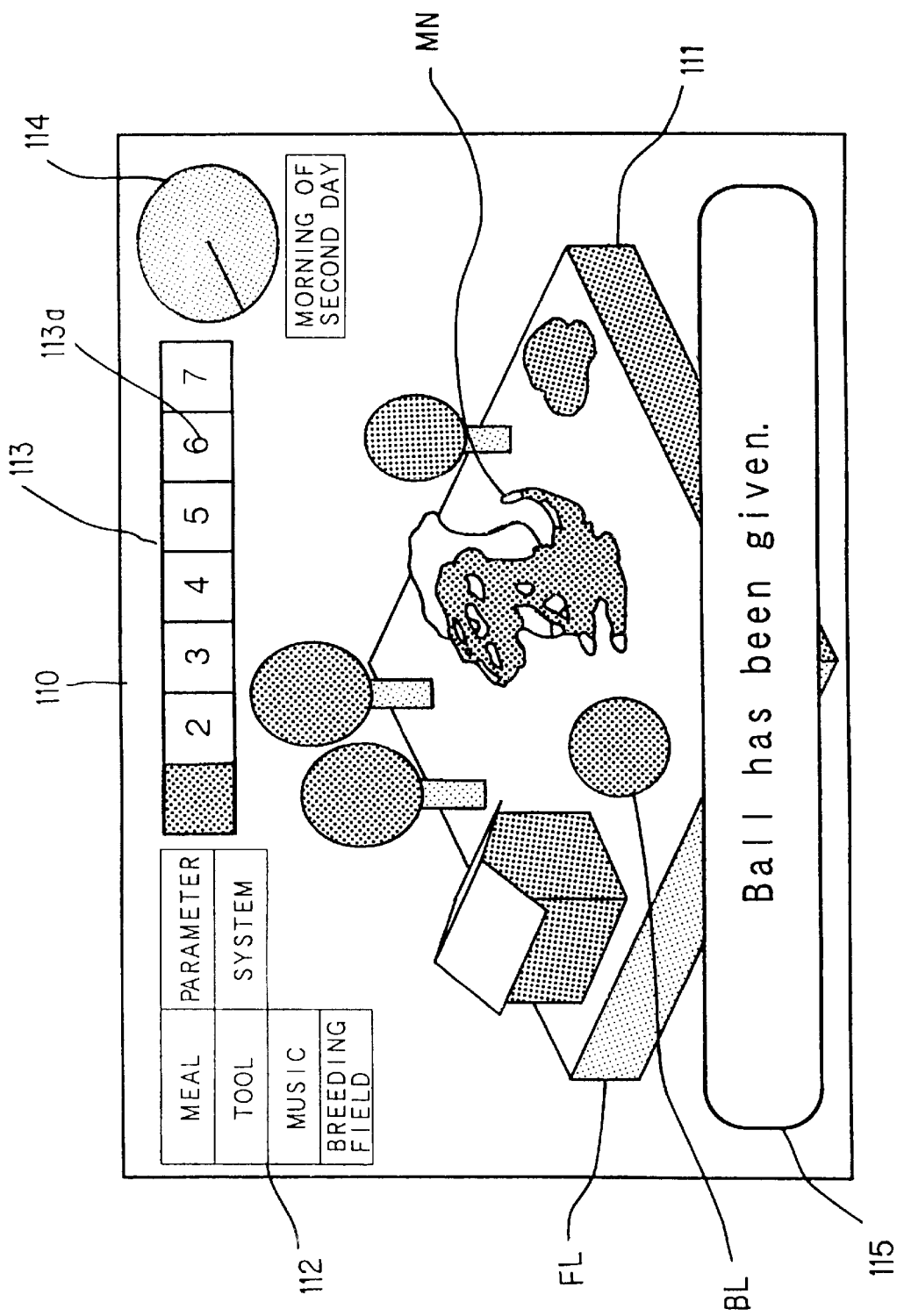
FIG. 8 is a diagram illustrating a breeding game image displayed in the process of FIG. 5.

The breeding game image 110 of FIG. 8 comprises a breeding field display section 111, a command menu display section 112, a field number indicating section 113, a clock display section 114, and a guidance display section 115. In the breeding field display section 111, there is displayed a scene in which a monster MN is bred in the breeding field FL. If the monster MN is not bred, only the empty breeding field FL is displayed. In this game system 1, the player can simultaneously use seven breeding fields, and can breed different monsters in the respective breeding fields. Accordingly, one of the seven breeding fields is selectively displayed in accordance with the operation of the player.

In the command menu display section 112, there is displayed a list of commands which can be selected by the player with respect to the breeding of the monster MN. The contents of the list can be changed as to whether or not the monster is bred in the breeding field displayed in the breeding filed display section 111. Namely, if the monster is bred in the breeding field displayed in the breeding field display section 111, the six commands, that is, a "meal", a "tool", "music", a "breeding field", a "parameter" and a "system" are displayed. In case that the monster is not bred, only the two commands, that is, a "making field" and the "system" are displayed. A command which is not displayed in the command menu display section 112 cannot be selected by the player.

In the field number indicating section 113, there are displayed numerals corresponding to respective numbers of the seven breeding fields. The numeral corresponding to the breeding field currently displayed in the breeding field display section 11 is displayed distinctively from the other numerals by inverting or changing brightness thereof.

In the clock display section 114, there are displayed the current time, a number of days lapsed from a beginning of a breeding of the monster and the like. The guidance display section 115 appears on the lower portion of the breeding field display section 111 only in case of necessity.

After the breeding game image 110 is displayed, the CPU 11 judges whether or not the monster is currently bred (step S102 of FIG. 5). If the monster is bred on at least one of the seven breeding fields, the CPU 11 makes an affirmative judgement at the step S102, resumes the clocking to advance the time of the game which has been suspended (step S103), and then judges whether or not the player operates the controller 52 on the basis of the signals issued therefrom (step S104). If it is judged that the monster is not bred at the step S102, the step S103 is omitted and the process proceeds to the step S104.

If it is judged that the operation is performed at the step S104, the CPU 11 judges whether or not an operation for changing the breeding field to be displayed in the breeding field display section 111 is performed (step S105). If it is judged affirmative at the step S105, the image of the breeding field corresponding to the newly designated field is displayed, and the process proceeds to the step S130 of FIG. 6. If it is judged negative at the step S104, the CPU 11 judges whether or not an automatic breeding mode described later is set (step S141 of FIG. 6). If the automatic breeding mode is set, the CPU 11 checks details of setting thereof (step S142), and the process proceeds to the step S130 of FIG. 6. If the automatic breeding mode is not set, the step S142 is omitted and the process proceeds to the step S130.

If it is judged negative at the step S105 of FIG. 5, the CPU 11 determines that a command select operation for selecting the command displayed in the command menu display section 112 is performed by the player, and displays in the menu display section 112 a sub-menu corresponding to the selected command (step S107). For example, if the player selects the "meal" command through the controller 52, there are displayed selectable items associated with the meal, such as "meat", "vegetables", "water" and the like in the menu display section 112 as the sub-menu.

If the player selects one of the items in the sub-menu, the CPU 11 judges whether or not the selected item is associated with one of the "meal", the "tool" and the "music" (steps S108 and S109). If it is judged negative, the CPU 11 judges whether or not the item associated with the "breeding field" is selected (step S 111). If it is judged negative, the CPU 11 judges whether or not the item associated with the "system" is selected (step S 112). If it is judged negative, the CPU 11 judges whether or not the item associated with the "option" is selected (step S 113). If it is judged negative, the process proceeds to the step 130 of FIG. 6.

If it is judged affirmative at the step S111 of FIG. 5, the CPU 11 performs a breeding start process (step S120). This process is performed in accordance with a procedure shown in FIG. 9. The summary of the procedure is as follows; first the "breeding field" is prepared next the "egg" is selected, and then the "monster" is hatched from the egg. Namely, a base select process is performed (step S201).

The "base" is set as an element for defining a basic configuration of the breeding field, and a base select image 120 illustrated in FIG. 10 is displayed in the base select process.

The base select image 120 is provided with a guidance display section 121 in which a message requiring selection of the base is displayed, a selectable base display section 122 in which images of the selectable bases are displayed, and the field number indicating section 113 mentioned in the above. In the selectable base display section 122, there are displayed three base images BS1, BS2 and BS3 which are referred to as a "desert", a "rocky mountain" and a "lake", respectively. However, numerous image data of bases which are modeled on various configurations are prepared and stored on the CD-ROM 44 besides the above mentioned three images.

When the player performs a predetermined select changing operation to the controller 52, the images displayed in the selectable base display section 122 are horizontally scrolled and the base enclosed by a select frame 122f is changed. If the player performs a predetermined decision operation to the controller 52, the CPU 11 determines that the base displayed in the select frame 122f at that time is selected, and stores the data for specifying the selected base into the breeding information storing area A3 in the main memory 13 in association with the number of the breeding field.

Figure 9:
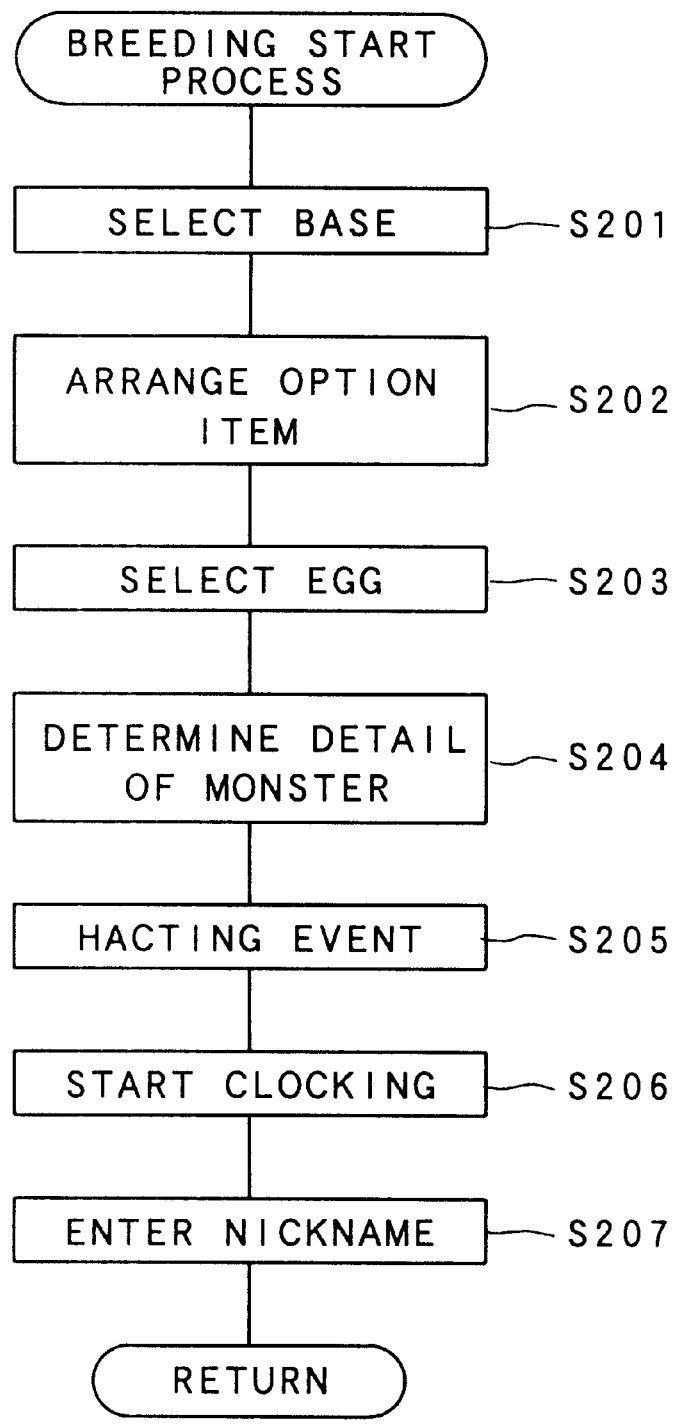
FIG. 9 is a flow chart showing a process performed when the beginning of breeding of a monster is requested in the process of FIG. 5.

After the base select operation is finished, an optional item arranging process is performed (step S202 of FIG. 9). In this process, an item arrangement image 130 illustrated in FIG. 11 is displayed. The image 130 is provided with a guidance display section 131 in which an message urging the player to select and arrange an optional item is displayed, a breeding field display section 132 in which the current state of the breeding field is displayed, a list display section 133 in which a list of selectable items is displayed, and the field number indicating section 113 mentioned in the above.

As is apparent from the illustration of the list display section 133, the "optional item" is prepared as an element decorating the base. The optional item may be, for example, an artificial structure such as a shed, a natural object such as a plant or a rock, and so on. If the player performs a predetermined select operation on the controller 52, one item corresponding to the select operation is selected among the items displayed in the list display section 133 is selected, and the selected item is displayed in the predetermined position on the base BS displayed in the breeding field display section 132. After this, if the player performs a predetermined arranging operation, the position of the item displayed in the section 132 is changed in accordance with the operation of the player to thereby arrange the item on the desirable position. The series of these operations allows the player to design the desirable breeding field. In FIG. 11, a shed item IT1, tree items IT2 . . . IT2 and a rock item IT3 are arranged on the base BS.

When the arrangement of the items is finished, data specifying the selected items and the positions thereof are stored in the breeding information storing area A3 in the main memory 13 in association with the number of the breeding field.

After finishing the arrangement of the items, an egg select process is performed (step S203 of FIG. 9). In this process, an egg select image 140 illustrated in FIG. 12 is displayed. The image 140 is provided with a guidance display section 141 in which a message urging the player to select an egg is displayed, a list display section 142 in which a list of names of selectable eggs is displayed, an egg image display section 143 in which an image of an egg enclosed with a select frame 142a in the list display section 142 is displayed, and the field number indicating section 113.

The contents of the list of the eggs displayed in the list display section 142 are modified in accordance with the progress of the game. For example, only a number of the eggs are considered as the selectable eggs at the beginning of the game, and the number of the selectable eggs increases or decreases in accordance with the progress of the game. As an example thereof, there is an egg which cannot be selectable unless the piece stops at a predetermined square in the chess mode mentioned later. In FIG. 12, blanks 142b and 142c are provided in the list display section 142 to imply the player that some of the eggs are not selectable at present. In the egg information storing area A2 of the main memory 13, there are stored data defining features of the eggs (names, types of the monsters hatched therefrom, and the like) and data for specifying whether each egg is currently selectable or not in association with the number of each egg. When the extent of the selectable eggs is changed, the data in the egg information storing area A2 is updated.

If the player performs an egg select operation to the controller 52, the names of the eggs displayed in the list display section 142 are vertically scrolled and the egg enclosed with the select frame 142a is changed. If the player performs a predetermined decision operation on the controller 52, the CPU 11 considers that the egg displayed in the select frame 142a at that time is selected, and stores the data for specifying the selected egg into the breeding information storing area A3 in the main memory 13 in association with the number of the breeding field.

After the selection of the egg, the CPU 11 determines the feature of a monster to be hatched from the selected egg on the basis of the data set through the above processes (step S204 of FIG. 9). Namely, in this game, a lot of monsters (for example one hundred monsters) capable of appearing in the game are prepared, and data defining the feature of each monster (appearance, character and the like) are stored in the CD-ROM 44 in advance. In the process at the step S204, an initial parameter is calculated with reference to the selected base, the type and the position of the optional item disposed on the base and the type of the selected egg, the monster corresponding to the calculated initial parameter is selected among the monsters recorded in the CD-ROM 44 and the data defining the feature of the selected monster is loaded into the main memory 13.

After determining the feature of the monster, an egg hatching event is performed (step S205 of FIG. 9). As shown in FIG. 13, the breeding game image 110 is displayed in the egg hatching event. At this stage, the breeding field FL, having a configuration reflecting the results of the processes at the steps S201 and S202, is displayed in the field display section 111, and the selected egg EG is displayed in a predetermined position on the breeding field FL. Then, an animation representing a scene in which the monster selected through the above procedure is hatched from the egg EG is displayed for a predetermined time (for example 5 seconds). After the egg hatching event, the CPU 11 starts clocking to watch breeding time of the monster in the game (step S206 of FIG. 9). The information displayed in the clock display section 114 is changed on the basis of the breeding time. After this, an image for requesting the player to enter a nickname of the monster is displayed (step S207 of FIG. 9). If the player enters the desired nickname through the controller 52, then the breeding start process is finished and the process proceeds to the step S130 of FIG. 6.

If it is judged affirmative at the step S109 of FIG. 5, an event process corresponding to an item selected among the "meal", the "tool" and the "music" is performed (steps S109 to S121). In this process, an image corresponding to the item selected by the player is displayed in the breeding game image 110 and sound effects are produced. For example, if a "ball" item of the "tool" command is selected, an image of a ball BL (FIG. 8) is displayed in the breeding image 110, and an animation representing how the monster MN reacts thereto is also displayed. If the "music" command is selected, various numbers of music are displayed as the items in the sub-menu, and the music selected in the sub-menu is reproduced through the sound control section 30 (FIG. 1).

Further, in the process at the step S121, parameters which define the breeding state of the monster MN are adjusted in accordance with the operation of the player. The relationship between the commands and the effects thereof on the parameters is determined in advance and data defining the relationship is recorded in the CD-ROM 44 and loaded into the main memory 13 in accordance with necessity. Also, the above mentioned parameters are stored in the breeding information storing area A3 in the main memory 13 and the record thereof is updated when they are adjusted. Note that the parameters defining the breeding state of the monster are prepared to represent both of an element for specifying the feature of the monster and an element for specifying a breeding environment of the monster (for example the configuration of the breeding field).

If it is judged affirmative at the step S110 of FIG. 5, the CPU 11 judges whether or not the breeding field is combined with the other breeding field (step S122). If the breeding fields is not combined, the CPU 11 judges whether or not the player requests an exchange of the breeding fields (step S123). If the exchange is not requested, the CPU 11 judges whether or not the player requests a combination of the breeding fields (step S124). If the combination is requested, a predetermined combination process is performed (step S125).

Figure 14A:
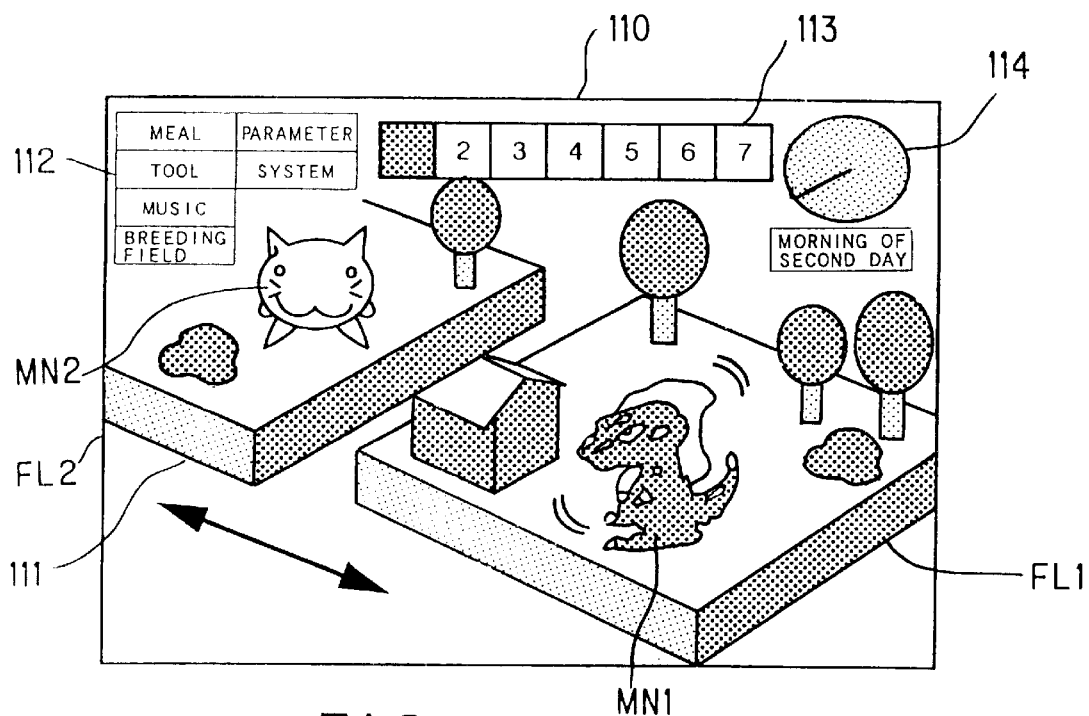
FIGS. 14A and 14B are diagrams illustrating images displayed when combination of breeding fields is performed in the process of FIG. 5.
Figure 14B:
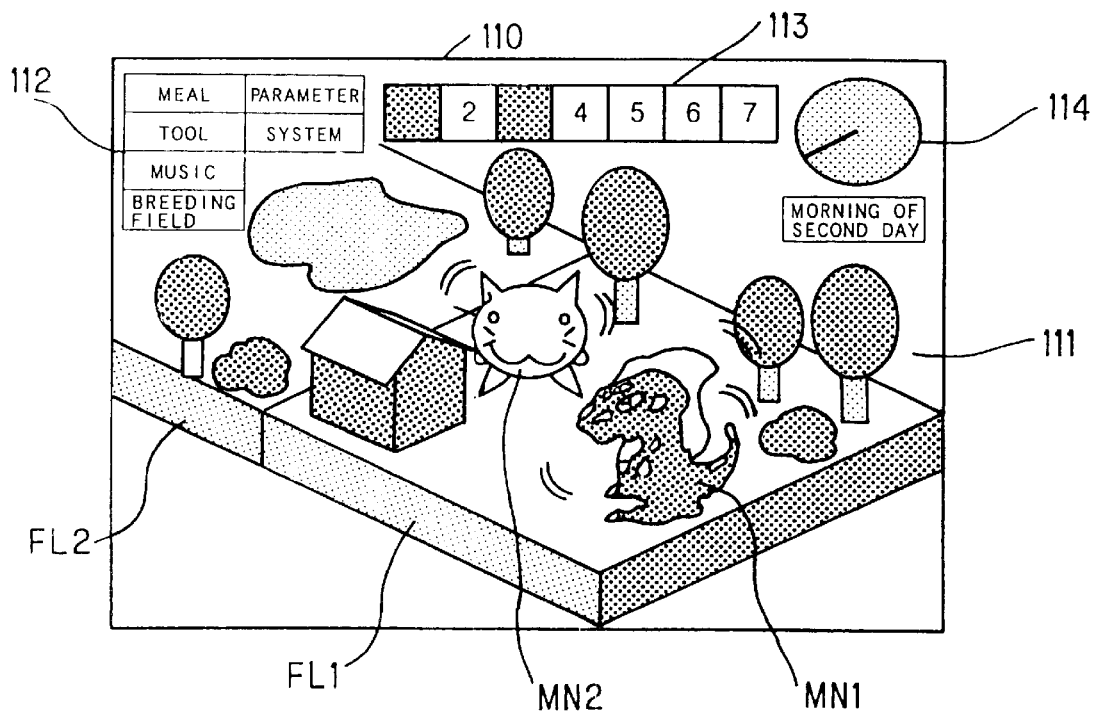

As shown in FIG. 14A, an animation representing a scene in which the two breeding fields FL1 and FL2 move close to and are combined with each other in the breeding game image 110 is displayed in the combination process. Then, as shown in FIG. 14B, an animation representing a scene in which the monsters MN1 and MN2 move back and forth between the breeding fields FL1 and FL2 is displayed.

If it is judged at the step S123 of FIG. 5 that the exchange of the breeding fields is requested, a predetermined exchange process is performed (step S126). The exchange process is a process in which the breeding field currently displayed in the breeding game image 110 is changed in accordance with an instruction of the player, and the procedure thereof is similar to that performed through the steps S201 and S202 of FIG. 9.

If it is judged at the step S122 of FIG. 5 that the breeding field is combined, the CPU 11 judges whether or not the player requests a separation of the breeding fields (step S127). If the separation is requested, a separation process is performed (step S128). The separation process is a process in which the breeding fields currently combined with each other are separated and restored to the state in which only one monster lives in each breeding field, and an animation representing a scene in which the combined breeding fields are separated from each other contrary to the case of FIGS. 14A and 14B. If it is judged negative at the step S127, the process proceeds to the step 130 of FIG. 6.

The above mentioned procedure at the steps S125, S126 and S128 are provided to bring the change to the breeding field to thereby change the breeding environment of the monster. Therefore, the parameters stored in the breeding information storing area A3 in the main memory 13 to define the breeding state of the monster are updated in accordance with the combination, the exchange or the separation of the breeding fields.

When the process proceeds to the step S130 of FIG. 6, the time lapsed from the beginning of the breeding of the monster in the game is calculated for each breeding field. Then, the CPU 11 judges whether or not each breeding field reaches to a predetermined parameter adjusting time (step S131). If it is judged affirmative, the parameters recorded in the breeding information storing area A3 in the main memory 13 is adjusted. For example, the process is performed in such a manner that the parameters defining the breeding state of each monster is changed by a predetermined amount every day in the game (step S132). After adjusting the parameters, the process returns to the step S104 of FIG. 5.

If it is judged negative at the step S131 of FIG. 6, the CPU 11 judges whether or not the monster in each breeding field reaches to a predetermined evolution time (step S131). For example, it is set that the evolution time comes when three days has lapsed after the beginning of the breeding. In this case, when the breeding time exceeds to three days, the affirmative judgment is made at the step S133. The evolution time is not limited to once, the plural times may be set as the evolution time. The number of the evolution times may be changed in accordance with the type of the monster.

As shown in FIG. 15, a message indicating the evolution status to the player is displayed in the guidance display section 115 in the breeding game image 110 (step S134 of FIG. 6) when the evolution time comes, and then the CPU 11 judges whether or not the player performs a cancel operation to the controller 52 within a predetermined time (step S135).

If the cancel operation is not performed, the CPU 11 adjusts the parameters defining the feature of the monster on the basis of the data stored in the breeding information storing area A3 in the main memory 13 (step S136), and then a predetermined evolution event is performed (step S137). In the evolution event, an image EF illustrated in FIG. 15 is displayed so as to cover the monster before the evolution in the breeding field display section 111 in the breeding game image 110, and after this, the monster after the evolution appears. Sound effects may be added to represent the evolution of the monster. After the evolution event, the process returns to the step S104 of FIG. 5. If the cancel operation is performed at the step S135, the evolution event is cancelled and the process returns to the step S104 of FIG. 5.

If it is judged at the step S133 of FIG. 6 that the evolution time does not come, the CPU 11 judges whether or not an event time comes on the basis of the lapsed time calculated at the step S130 (step S138), and performs a predetermined event process, if the event time comes (step S139). The event is prepared such that a natural phenomenon or the like, such as thunder or an earth quake, happens on the breeding field at a predetermined interval (for example every 50 hours), regardless of the operation of the player. The event is prepared as a factor causing the breeding environment of the monster to change, and therefore the parameters defining the breeding state of the monster recorded in the breeding information storing area A3 in the main memory 13 are adjusted and updated in accordance with the details of the performed event. After the event, the process returns to the step S104 of FIG. 5. If a negative judgment is made at the step S138, the event process is cancelled and the process returns to the step S104 of FIG. 5.

If an affirmative judgment is made at the step S112 of FIG. 5, the process proceeds to the step S152 of FIG. 7. At the step S152, the CPU 11 judges whether or not an "automatic breeding" is selected in the sub-menu corresponding to the "system" displayed at the step S107 of FIG. 5 (step S152), and performs an automatic breeding set-up process, if it is judged affirmative (step S153).

Figure 16:
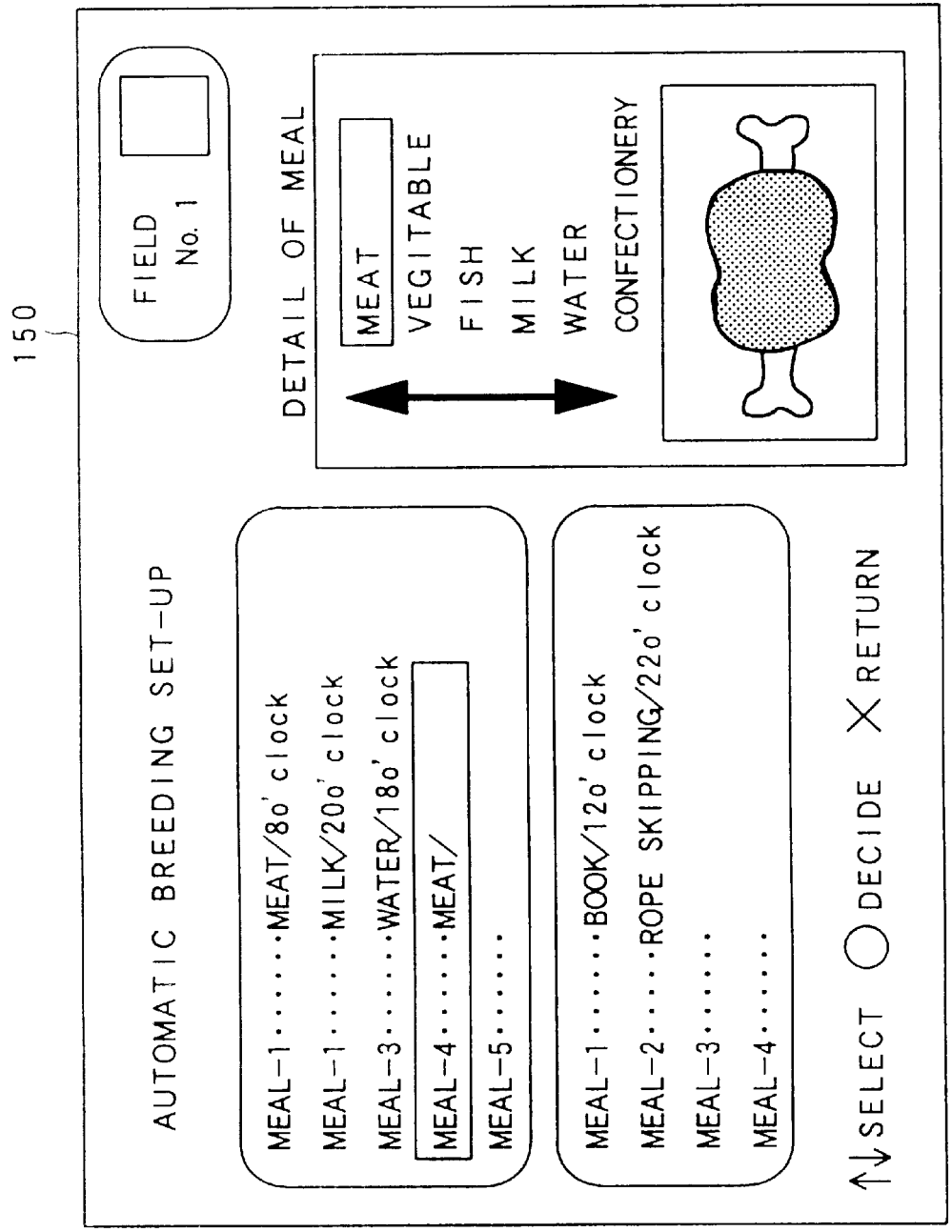
FIG. 16 is a diagram illustrating an image displayed in the automatic breeding set-up process of FIG. 7.

In the automatic breeding set-up process, there is displayed an automatic breeding set-up image 150 illustrated in FIG. 16. If the player performs a predetermined set-up operation on the controller 52, the CPU 11 sets up details of the "meal" and the "tool" for the monster in accordance with the operation of the player, and stores the set-up result in the breeding information storing area A3 in the main memory 13 in association with the number of the breeding field. With respect to the breeding field subjected to the "automatic breeding", the CPU 11 automatically performs the process corresponding to the "meal" command and the "tool" command in accordance with the details set-up through the above procedure until it is cancelled, and calculates and updates the parameters defining the breeding state of the monster in accordance with the result of the performed process. Since such an automatic process is prepared, the player need not perform complicated operations even if a plurality of monsters are simultaneously bred in the multiple breeding fields, so the player who does not prefer such a complicated operations can enjoy the game sufficiently.

If it is judged negative at the step S152 of FIG. 7, the CPU 11 judges whether or not an "option setting" is selected by the player (step S154), and performs a predetermined option setting process, if it is judged affirmative (step S155). In the option setting process, the details of options, such as game speed, state of ON-OFF of the display of the guidance display section 115 in the breeding game image 110 and the like, are changed in accordance with instructions from the player inputted through the controller 52. The details set up through the process are stored in the optional information storing area A5.

If a negative judgement is made at the step S154, the CPU 11 judges whether or not data saving is requested (step S156). If it is judged affirmative, the CPU 11 performs a data saving process in which the data stored at least in the piece information storing area A1, the egg information storing area A2, the breeding information storing area A3, the battle information storing area A4, the optional information storing area A4 and the monster information storing area A5 in the main memory 13 are stored into the memory device 53 (step S157). If a negative judgment is made at the step S156, the CPU 11 judges whether or not the player requests to stop the game (step S158), and performs a suspending process if it is judged affirmative (step S159). After this, the process returns to the step S8 in the main routine of FIG. 2. If a negative judgement is made at the step S158, the process returns to the step S130 of FIG. 6.

If an affirmative judgement is made at the step S113 of FIG. 5, the CPU 11 performs a parameter display process in which at least a part of the parameters defining the feature of the monster is presented to the player (step S129), and then the process proceeds to the step S130 of FIG. 6.

According to the above mentioned process in the breeding mode, if the player sets up the breeding field and hatches the monster thereon, the parameters defining the feature of the monster and the breeding environment thereof are adjusted in accordance with the operation of the player and the lapsed time of the breeding. When the predetermined evolution time comes during the breeding, the detail of the evolution is determined on the basis of the parameters adjusted until that time, and the image of the monster shown to the player is changed. Therefore, the player can find pleasure in breeding the monster.

The player can set up the breeding field as the breeding environment of the monster and the care of the monster performed by giving the food, the tool and the like thereto, and the parameters associated with the breeding state of the monster are changed in accordance with the detail of the breeding field. Therefore, it is possible to enhance interest of the game. Since the player can instruct the exchange, the combination and the separation of the breeding fields, and the parameters associated with the breeding state of the monster are also changed in accordance with that instructions, it is possible to provide the player with various ways to enjoy the game.

Figure 17:
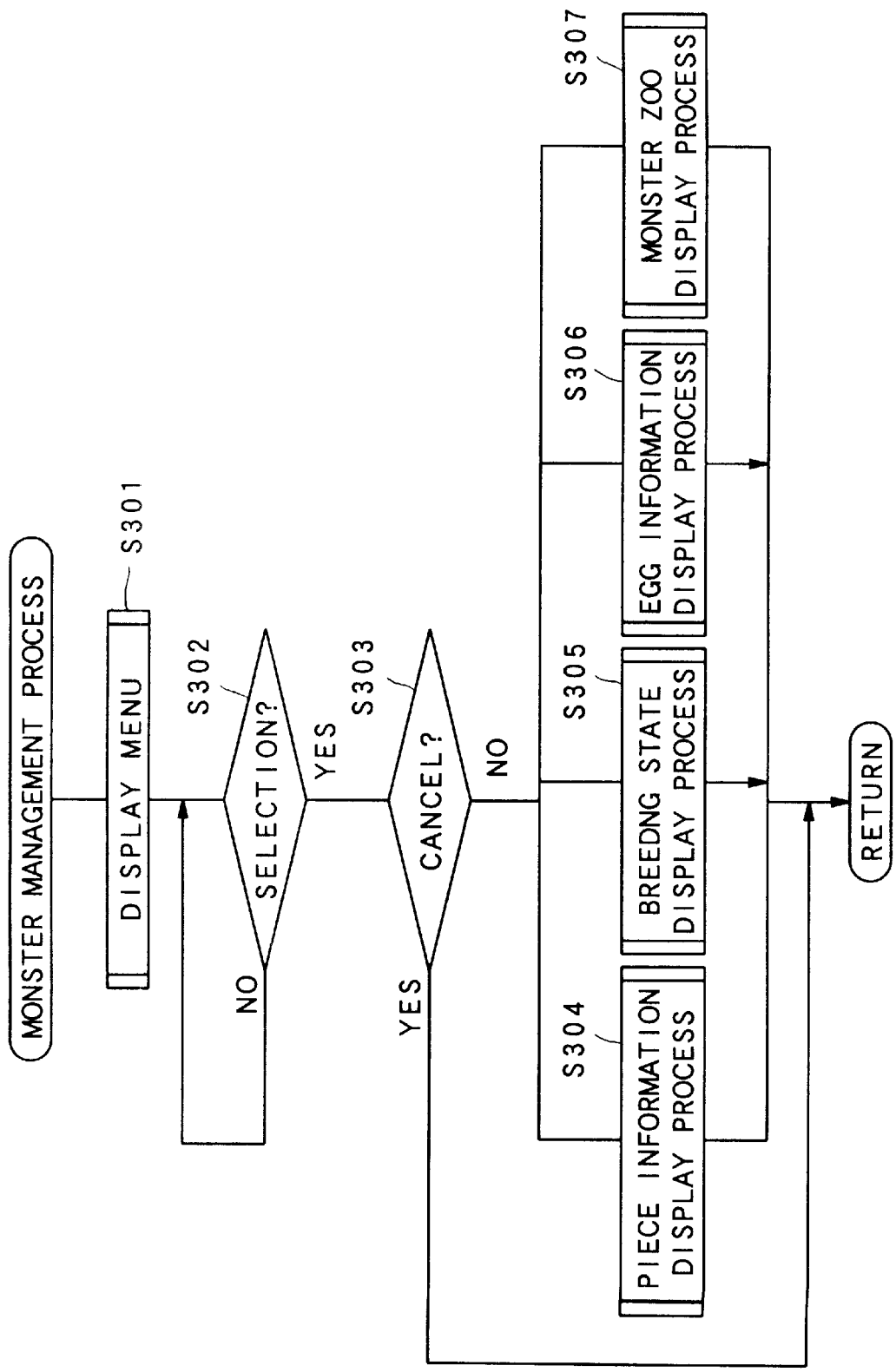
FIG. 17 is a flow chart showing a sub-routine performed when the monster management process is selected in the process of FIG. 2.

FIG. 17 is a flow chart showing a monster management process performed when a monster management mode is selected in the process of FIG. 2 (step S13). In this process, first of all, a menu which lists items selectable in the monster management mode is displayed (step S301). If the player operates the controller 52 in response to the display of the menu, the CPU 11 judges whether or not the operation accords to a cancel operation (step S302), and returns the process to that of FIG. 2, if it is judged as the cancel operation. If it is not judged as the cancel operation, the CPU 11 performs a process corresponding to the item selected by the player in the menu, that is, a piece information display process, a breeding status display process, an egg information display process, a monster zoo display process or a piece registration process (steps S304 to S307).

Figure 18:
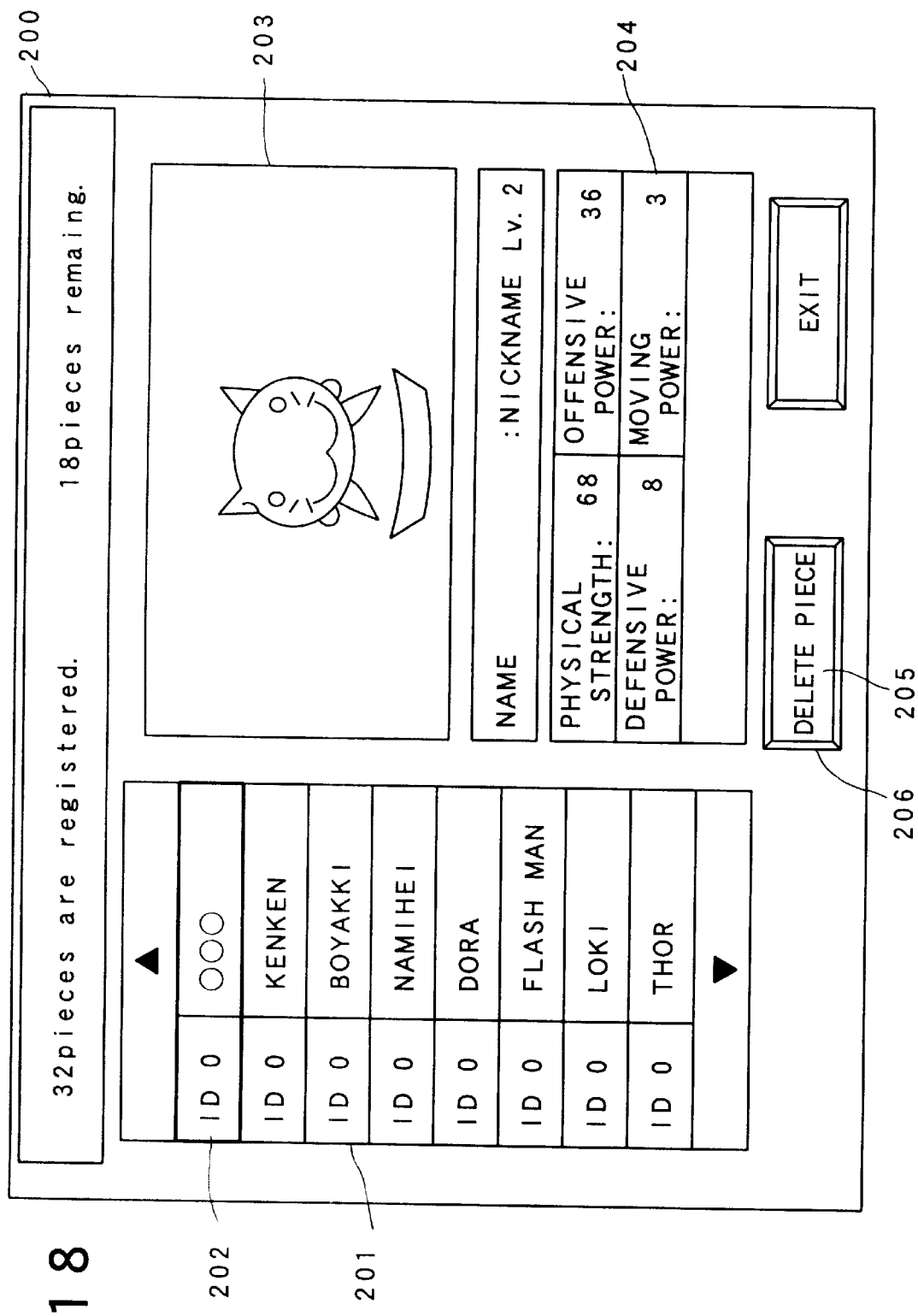
FIG. 18 is a diagram illustrating a piece information indicating image displayed when the piece information indicating process is selected in the process of FIG. 17.

In the piece information display process, there is displayed a piece information display image 200, as shown in FIG. 18, to inform the player of the details of the pieces useable in the chess mode. The piece information display image 200 is provided with a list display section 201 in which identification numbers of the pieces and names thereof are displayed so as to be associated with each other, a piece image display section 203 in which an image of the piece corresponding to the name enclosed by a select frame 202 in the list display section 201, and an ability display section 204 in which the name, the nickname and the ability of the piece in the piece image display section 203 are displayed. In the example of FIG. 18, values representing a "level", "physical strength", "offensive power", "defensive power, and "moving power" and a name of "special attack" are displayed in the ability display section 204 as the ability of the piece. The data for specifying the displayed information are stored in the piece information storing area A1 in the main memory 13 in association with the identification number of the piece. The maximum number of the pieces capable of being registered in the piece information storing area A1 is set so as to be greater than the number of the pieces useable in the chess mode. For example, if the six pieces are used in the chess mode, then fifty pieces can be registered in the piece information storing area A1 at the maximum.

At the lower portion of the piece information display section 200, there is displayed a delete button 205. If the player performs a predetermined delete select operation on the controller 52, the delete button 205 is enclosed by a select frame 206. Then, if the player performs a predetermined delete operation on the controller 52, information associated with the identification number of the piece enclosed by the select frame 202 in the list display section 201 is deleted from the piece information storing area A1. Therefore, the CPU 11 considers the identification number subjected to the delete operation as an empty number with which no piece is associated, and displays predetermined empty information in the piece display image 200.

Figure 19:
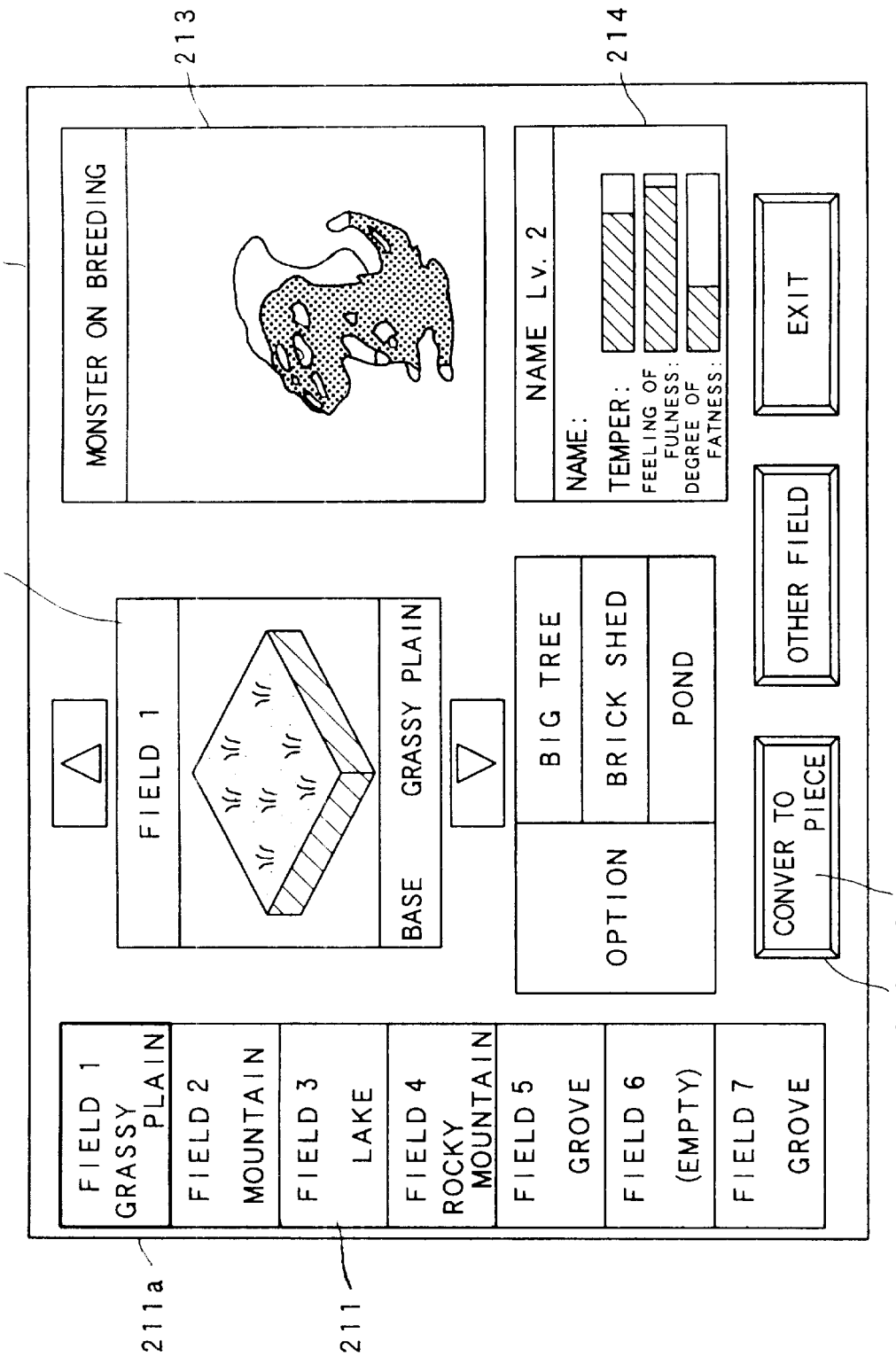
FIG. 19 is a diagram illustrating a monster breeding information indicating image displayed when the breeding state indicating process is selected in the process of FIG. 17.

If the breeding state display process at the step S305 of FIG. 17 is selected, an monster information display image 210 of FIG. 19 is displayed to inform the player of the details of the monster which is currently breeding in the breeding mode. The monster information display image 210 is provided with a field list display section 211 in which a list of the seven breeding fields is displayed, a field display section 212 in which the details of the breeding field enclosed by an select frame 211a (for example, the base and the types of the optional items disposed thereon) are displayed, a monster image display section 213 in which the image of the monster currently bred in the breeding field enclosed by the select frame 211a is displayed, and a feature display section 214 in which elements for specifying the breeding state of the monster displayed in the monster image display section 213 are displayed. In an example of FIG. 19, four elements, that is, a "level", a "temper", "feeling of fullness", and a "degree of fatness" are displayed in forms of bar graphs. The length of each bar graph in the feature display section 214 is calculated on the basis of the parameters defining the breeding state stored in the breeding information storing area A3 in the main memory 13. The player can understand the feature of the monster by checking the display in the feature display section 214.

At the lower portion of the monster information display image 210, there is provided a piece registration button 215 on which a command of "convert to piece" is represented. If the player performs a predetermined piece registration select operation on the controller 52, the piece registration button 215 is enclosed by a select frame 216. After this, if the player further performs a predetermined registration operation on the controller 52, the CPU 11 performs a piece registration process shown in FIG. 20. In short, the piece registration process is a process in which the monster is converted and registered as a piece useable in the chess mode.

In the piece registration process, first of all, the CPU 11 judges whether or not an identification number in the "empty" condition remains in the piece information storing area A1 in the main memory 13 (step S401). If it does not remain, a message requiring the player to delete one of the pieces is displayed (step S403). If the empty number remains, a message requesting the player to make sure that the piece can be registered (step S 405) is displayed. If the player definitely requests the registration, the CPU 11 prepares data of the piece corresponding to the feature of the monster (steps S406 and S407).

When the monster, for example, in the breeding field of the number 1 is registered as the piece, the CPU 11 refers to the parameters stored in the breeding information storing area A3 in the main memory 13 in association with the field number 1, and determines a property of the piece which includes the appearance of the piece and the ability thereof, such as a level, physical strength, offensive power, defensive power, moving power and a type of special attack. Therefore, the feature of the monster bred in the breeding mode is associated with the property of the piece, so that the result of the breeding managed by the player affects superiority of the piece in the battle which will be performed after the registration. The prepared data of the piece is stored in the piece information storing area A1 in the main memory 13 in association with the identification number of the piece.

Figure 21:
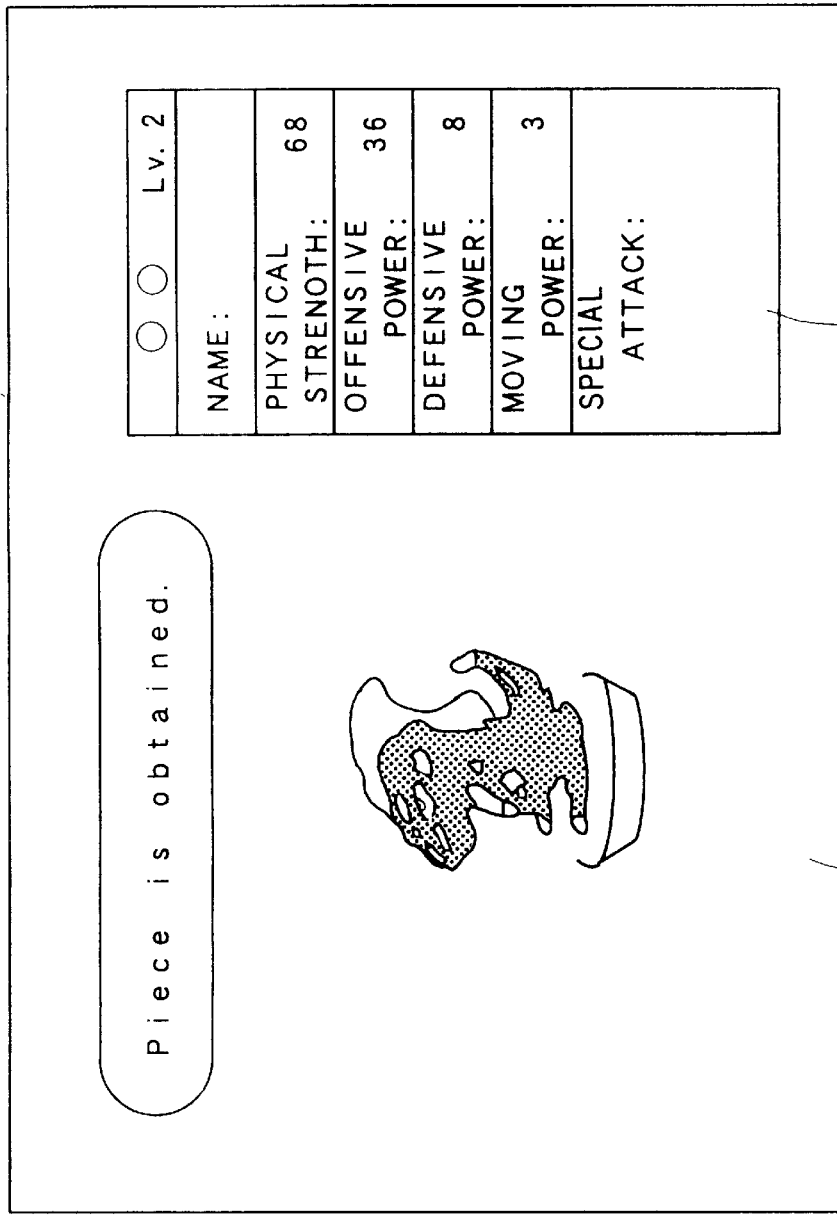
FIG. 21 is a diagram illustrating a piece registration image displayed in the process of FIG. 20.

After preparing the piece data, information associated with the result of the registration is displayed to the player (step S408). One example thereof is illustrated in FIG. 21. In this case, there are displayed a registration result display image 220 comprising a piece image display section 221 in which an appearance of the prepared piece is displayed and an ability indicating section 222 for indicating the ability of the piece is displayed.

Figure 20:
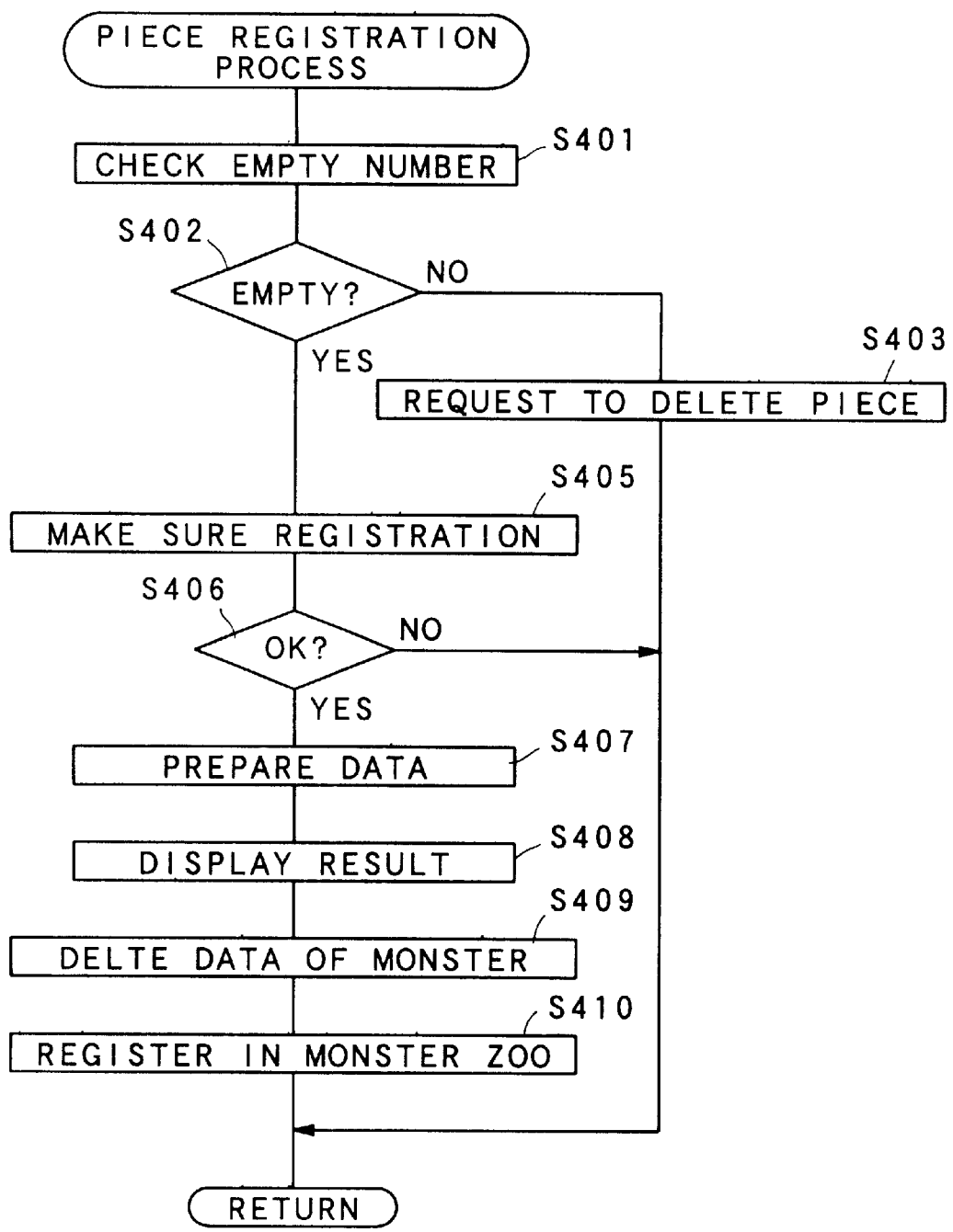
FIG. 20 is a flow chart showing a piece registration process performed in response to a request of registration of the piece when in the state that the image of FIG. 19 is displayed.

After displaying the result of the registration, the data defining the feature of the monster registered as the piece, which are necessary only in the breeding mode, are deleted from the breeding information storing area A3 in the main memory 13 (step S409 of FIG. 20). For example, if the monster in the breeding field numbered 1 is registered as the piece, the data associated with the field number 1 are deleted. Therefore, the field number 1 is considered by the CPU 11 as an "empty" condition in the breeding mode, so that the breeding of a new monster is allowed with respect to the breeding field numbered 1. In this game system, there are no means to restore the piece, which is once registered, to the monster, and the player can only delete the piece through the image 200 of FIG. 18. Since the feature of the monster and the property of the piece are associated with each other, the player must consider when the monster should be converted to the piece, so that the interest of the game is enhanced.

After deleting the data of the monster, the CPU 11 performs a predetermined registration process with respect to the monster zoo information storing area A6 in the main memory 13 (step S410). After this, the process returns to the state in which the monster information display image 210 of FIG. 19 is displayed. The detail of the registration to the monster zoo information storing area A6 is explained below.

Figure 22:
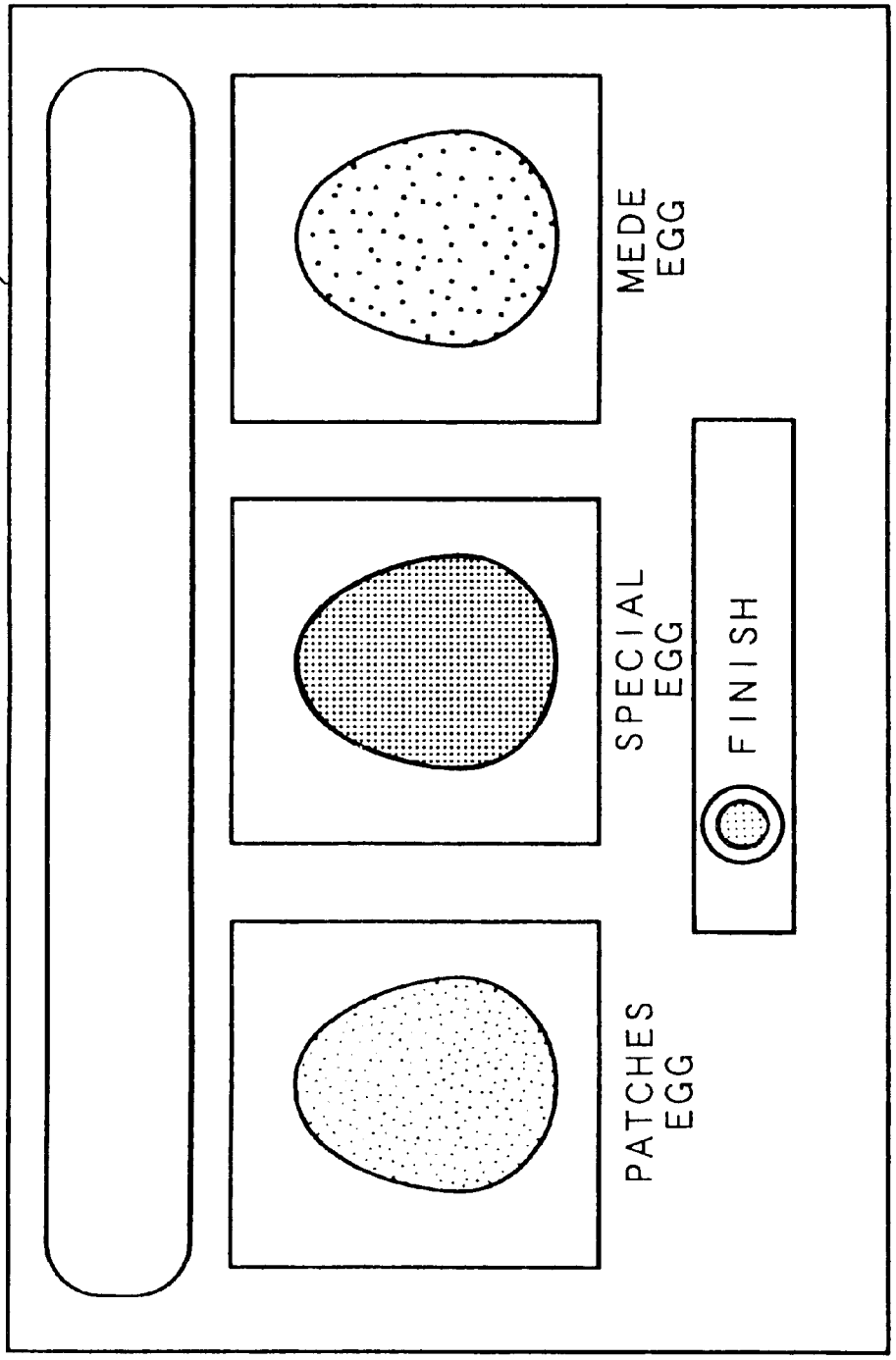
FIG. 22 is a diagram illustrating an image displayed when the egg information indicating process is selected in the process of FIG. 17.

If an egg information display process (step S306 of FIG. 17) is selected, an egg information display image 230 illustrated in FIG. 22 is displayed. In this egg information display image 230, there is displayed a list of the eggs which are currently selectable by the player on the basis of the data stored in the egg information storing area A2 in the main memory 13.

Figure 23:
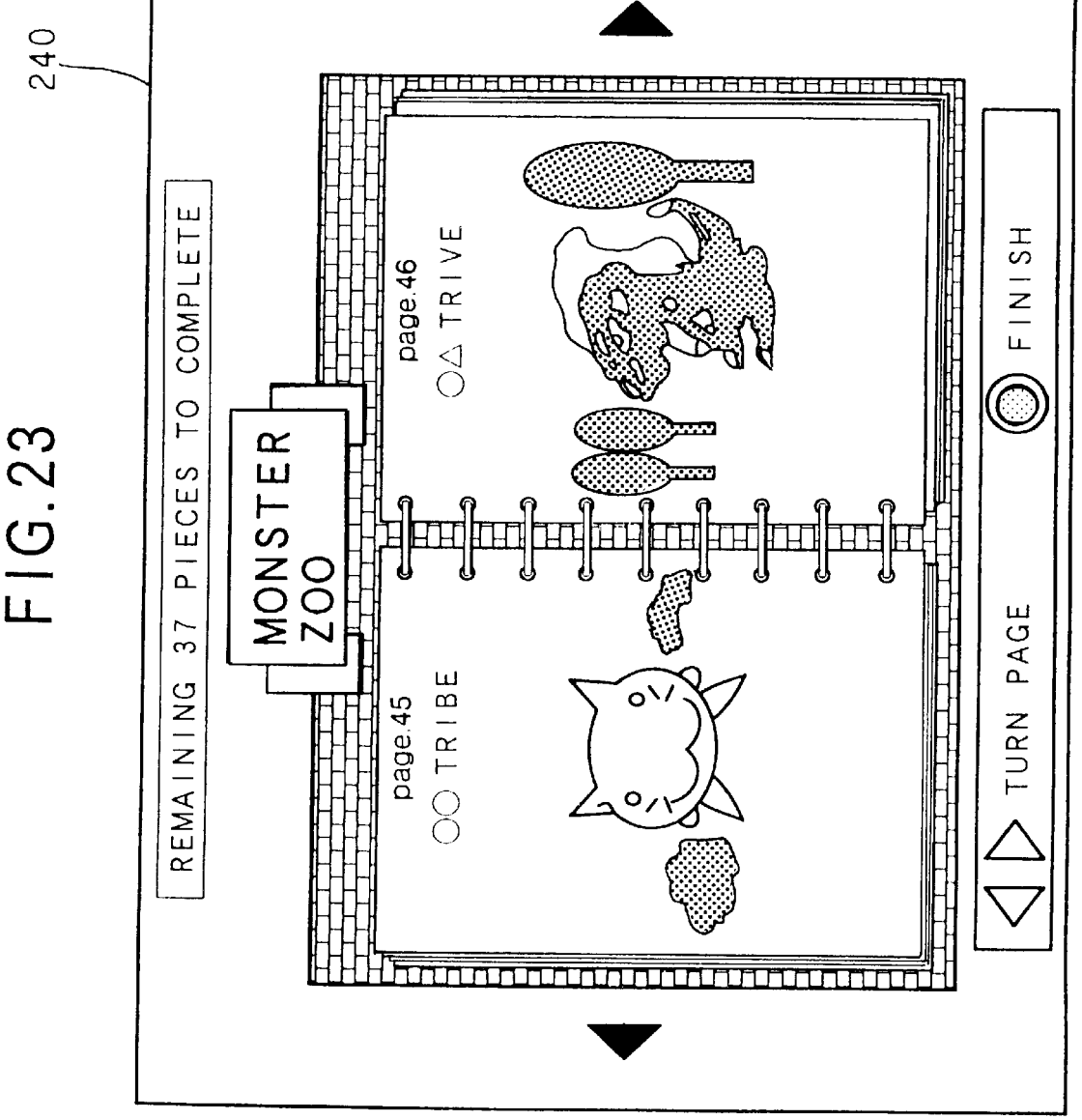
FIG. 23 is a diagram illustrating an image displayed when the monster zoo observing process is selected in the process of FIG. 17.

If a monster zoo display process (step S307 of FIG. 17) is selected, a monster zoo image 240 illustrated in FIG. 23 is displayed. The monster zoo image 240 is prepared to display the monsters registered as the pieces and owned by the player in a pictorial manner. As long as the monster is once registered as the piece, the monster can be observed through the monster zoo image 240 is not deleted even if the player deletes the piece from the above mentioned piece information display image 200. Therefore, flag bits for distinguishing whether or not each monster has experience of being registered as the piece are provided in the data stored in the monster zoo information storing area A6, and the flag bits are associated with the monsters capable of appearing in the game, respectively.

Then at the step S410, the value recorded in the flag bit corresponding to the monster registered as the piece is changed from the value "0" indicating inexperience of the registration to the value "1" indicating that the monster has the experience of being registered. In the monster zoo display process of FIG. 17, the value of each flag bit in the monster zoo information storing area A6 is read out, and the information associated only with the monster corresponding to the flag bit of the value "1" can be displayed in the image 240. The display of the monster zoo allows the player to know the existence of the monster having no experience of being registered, and it is possible to provide the player with pleasure in seeking the birth and the evolution of the unknown monster through modification of the breeding environment or the like and in collecting the unknown monsters.

If the player performs a predetermined suspending operation on the controller 52 when the image of FIG. 18, FIG. 19. FIG. 22 or FIG. 23 is displayed, the monster management mode is suspended and the process returns to the step S28 of FIG. 2.

Figure 24:
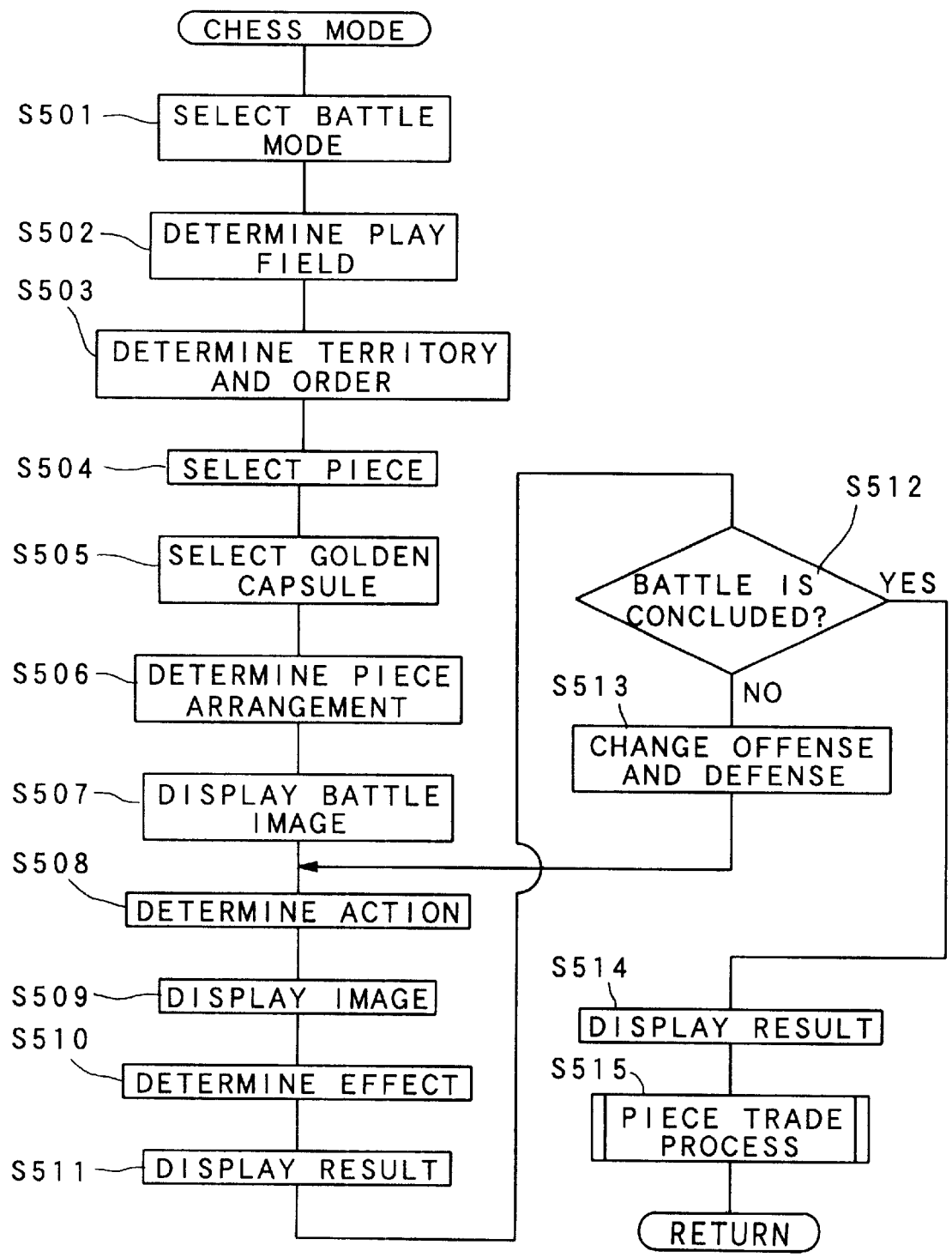
FIG. 24 is a flow chart showing a sub-routine performed when the chess mode is selected in the process of FIG. 2.

FIG. 24 is a flow chart showing a procedure of the battle game carried out if the chess mode is selected in the process of FIG. 2 (step S12). In this procedure, first of all, the player is requested to select a battle mode (step. S501). In this game, two modes are prepared as selectable modes in the chess mode. One is a mode in which the player competes with an opponent prepared by the CPU 11, and the other is a mode in which two players who operate the respective controllers 52, 52 compete with each other.

Figure 25A:
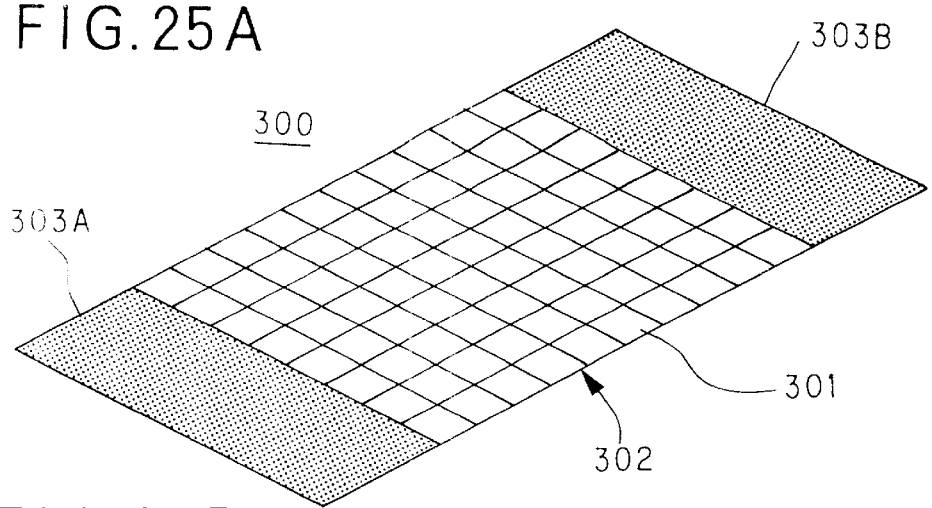
FIGS. 25A to 25C are diagrams illustrating a schematic configuration of the play field determined in the process of FIG. 24.
Figure 25B:
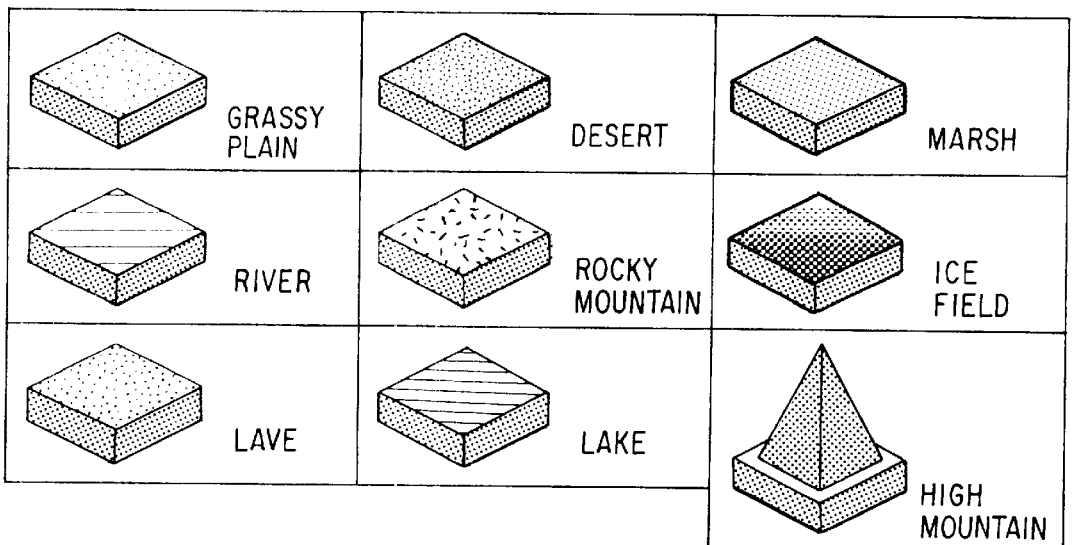

After selecting the battle mode, a play field is determined (step S502). As shown in FIG. 25A, the play field is basically consisted of a battle field 302 comprising a lot of squares 301 . . . 301 arranged in a matrix, and a pair of territories 303A, 303B disposed at both ends of the battle field 302. As shown in FIG. 25B, each square is associated with a configuration such as a "grassy plain", a "desert" or the like in advance. The configuration of the square 301 affects the movement of the piece during the battle. For example, the piece which does not have the ability either of flying nor of swimming cannot pass the square having a configuration of a "lake".

Figure 25C:
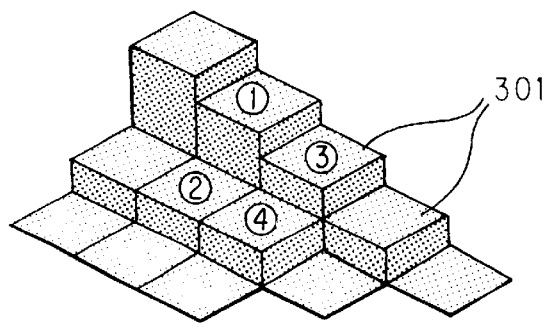

As shown in FIG. 25C, there are differences in heights between the squares. The difference in the height affects the movement of the piece in the play field. When the monster is registered as the piece, the "moving power" defining how many squares the piece can move at one turn is determined as the element of the ability of the piece (refer to FIG. 21). For example, the piece having the moving power of 3 units can move three squares beyond the current position at one turn. However, if there is one step of the height in the movable range of the piece, one unit of the moving power is lost to overcome the step when the piece moves to the higher side from the lower side. As a result, even if the piece has the moving power of three units, the piece can actually move by only two squares at one turn. When the CPU 11 estimates the superiority of the battle between the pieces, it is adjusted that the attack from the higher side to the lower side is more effective than that in the reverse case.

After determining the play field, next the territory and the order of the action are determined (step S503). Namely, the CPU 11 performs a lottery as to which should be given to the player, a right to select the territory 303A or 303B, or a priority of action, and then determines assignment of the territories 303A and 303B and the order of the action on the basis of the result of the lottery.

Figure 26:
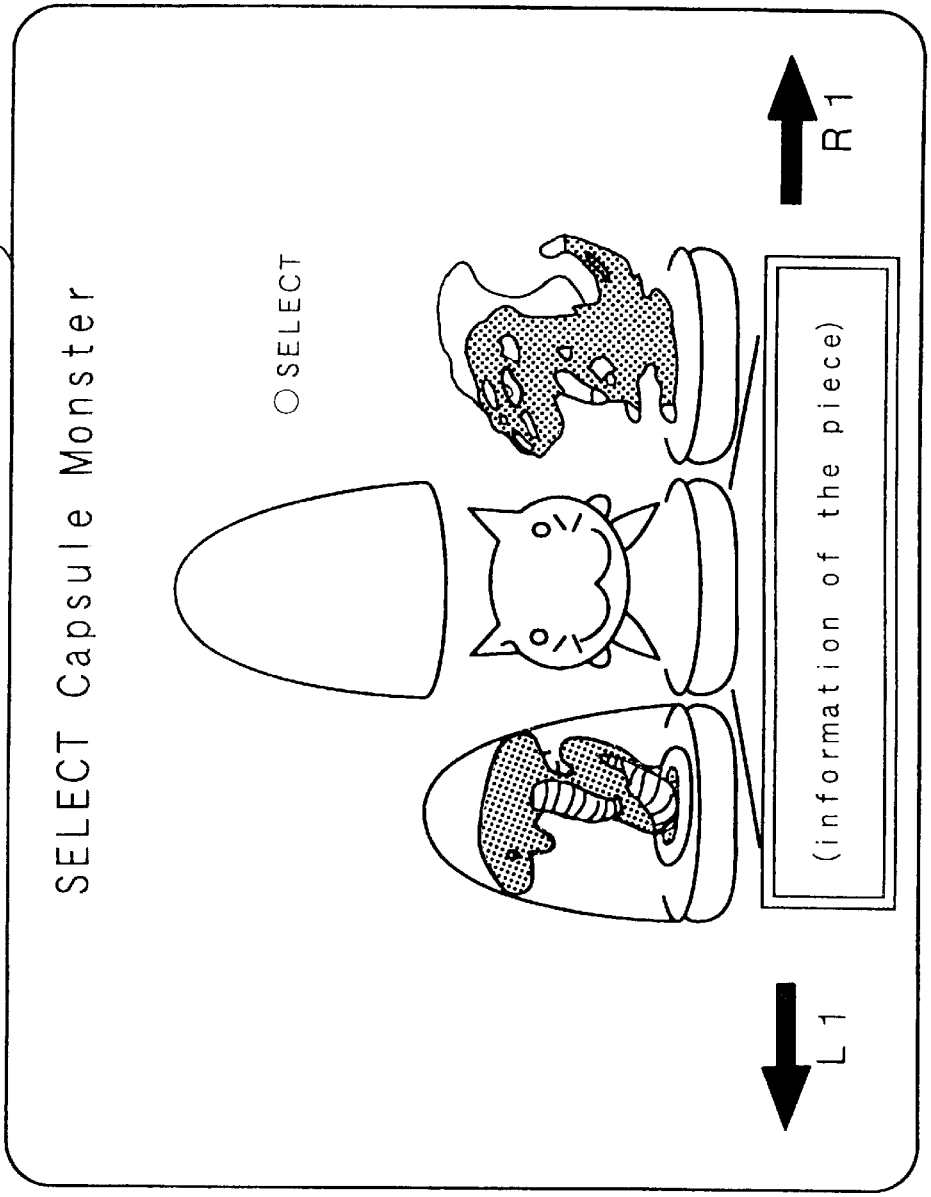
FIG. 26 is a diagram illustrating an image displayed when the piece is selected in the process of FIG. 24.

After this, selection of the pieces to be used in the battle game is performed (step S504). In this process, the CPU 11 specifies the pieces owned by the player on the basis of the data stored in the piece information storing area A1 in the main memory 13. Then, a piece selection image 310 illustrated in FIG. 26 is displayed to the player. The selectable pieces which are represented as the monsters in capsules are displayed in the middle of the selection image 310, and the pieces are horizontally scrolled in accordance with the selection operation of the player. If the player performs a predetermined decision operation when the desirable piece is displayed in the middle of the image 310, the piece is selected as that to be used in the chess mode. This operation is repeated to select the pieces of the predetermined numbers (for example 6 pieces). The result of the selection is stored in the battle information storing area A4 in the main memory 13.

Figure 27:
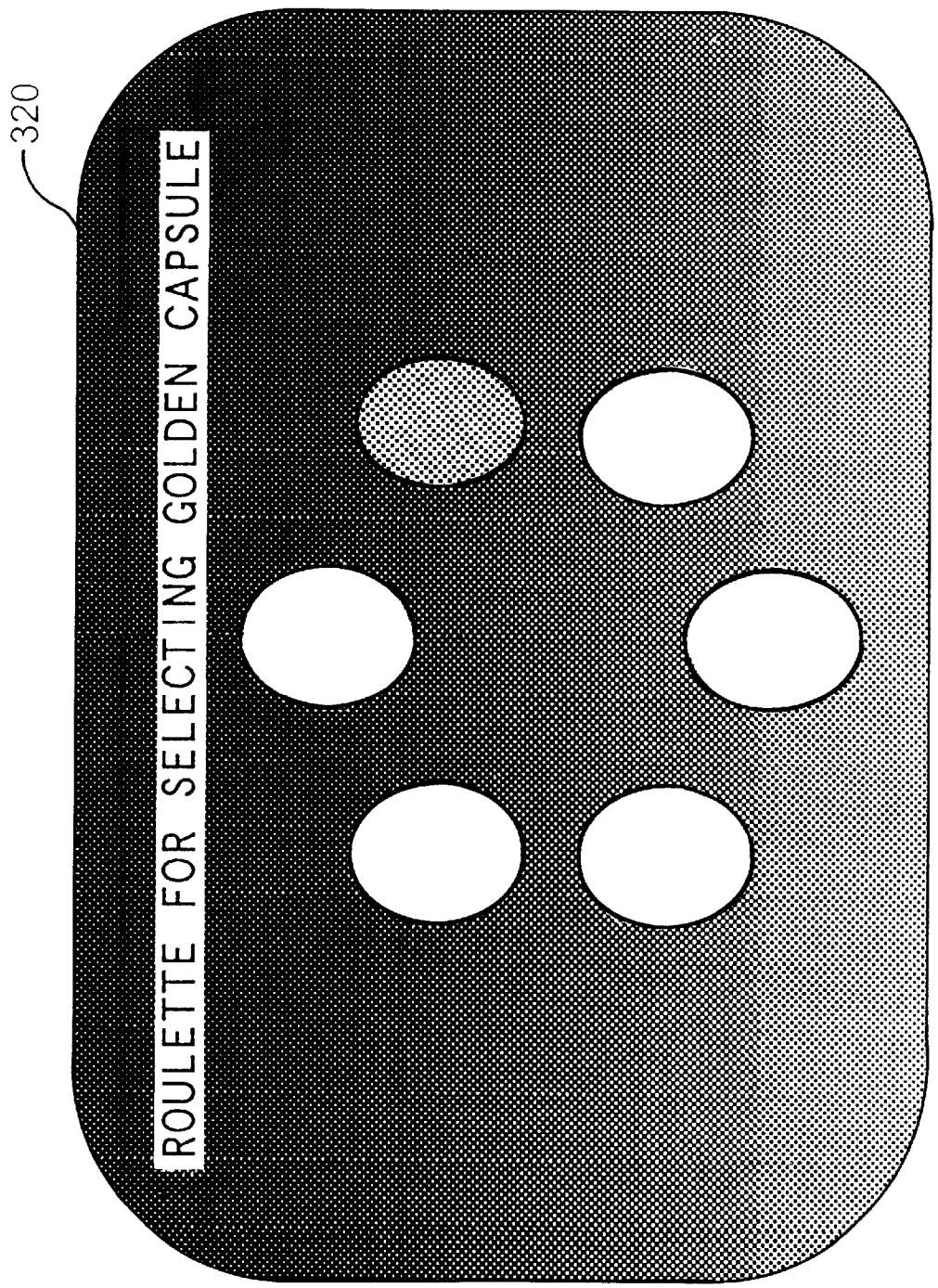
FIG. 27 is a diagram illustrating an image displayed when the golden capsule is selected in the process of FIG. 24.

After finishing the selection of the pieces, the CPU 11 performs a process to select a "golden capsule" among the six pieces selected by the player (step S505). At this time, a lottery image 320 illustrated in FIG. 27 is displayed to the player, and the progress of the selection is displayed. Namely, there are displayed the six pieces selected by the player so as to form a circle in the lottery image 320, and one of the pieces are displayed in a reversal manner to represent the position of the golden capsule. When the CPU 11 starts the selection process, an animation in which the position of the reversal display is changed in the clockwise direction is displayed. If the player performs a predetermined decision operation, the speed of switching the position of the reversal display gradually decreases, and finally the animation is terminated when the piece selected as the "golden capsule" is displayed in the reversal manner.

After selecting the "golden capsule", next the CPU 11 performs a piece arrangement process in which the six pieces including the "golden capsule" are disposed at desirable positions in the play field, respectively (step S506). At this time, the player can select one of two optional ways, one of which is prepared to allow the player to designate the position of each piece one by one, and the other of which is prepared to cause the CPU 11 to decide the arrangement of the pieces automatically. The piece selected as the "golden capsule" can optionally be disposed in the same way as in the case of the other pieces, however, the position of the golden capsule" is limited in the territory 303A or 303B (refer to FIG. 25A).

Note that, the procedure of the steps S504 to S506, is executed with respect to both of the player and the opponent thereof. If the opponent is prepared by the CPU 11, the CPU 11 automatically executes all of the selection of the pieces, the decision of the golden capsule, and the arrangement of the pieces with respect to the opponent of the player. If the opponent is another player, opportunity of setting is given to each player. If the mode in which the two players compete with each other is selected at the step S501, the data associated with the useable pieces is loaded into the main memory 13 from each of the memory devices 53, 53 of the respective players. Therefore, each player can select the desirable pieces among those bred by himself and enjoy the battle therewith.

After arranging the pieces, a battle image representing a scene in which the pieces of the player and the opponent are arranged on the play field, which is determined at the step S502, is displayed (step S507), and then a chance to determine the detail of action is given to the side having the priority of the action (step S508). In the present game, the player can select three types of action for each piece, that is, "move", "attack", and "special attack". The game is advanced in such a manner that turns alternately come to the player and the opponent, and they select one piece performing the action among the pieces owned by themselves and give a command consisted of one or a combination of the above mentioned three types of the action to the selected piece at each turn.

The detail of the action is changed in accordance with the ability of the piece. For example, with respect to the "move" action, the pieces are classified into several types in accordance with the ability thereof, and different movable patterns are set to the respective types of the pieces. As shown in FIG. 28 as an example, there are prepared a Q type which can move in the front, rear, right and left side directions and can also move in the diagonal directions of the square, an R type which can move only in the front, rear, right and left side directions, and a B type which can move only in the diagonal directions. The same classification is applied to the "attack" and "special attacks" action. The piece selected as the "golden capsule" cannot be selected as the piece performing the action.

Figure 29A:
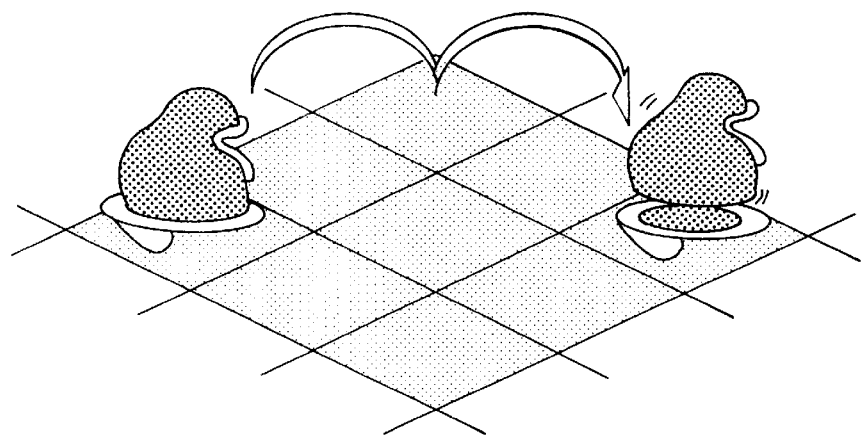
FIGS. 29A and 29B are diagrams illustrating scenes of animations displayed during the battle game performed in the process of FIG. 24.
Figure 29B:
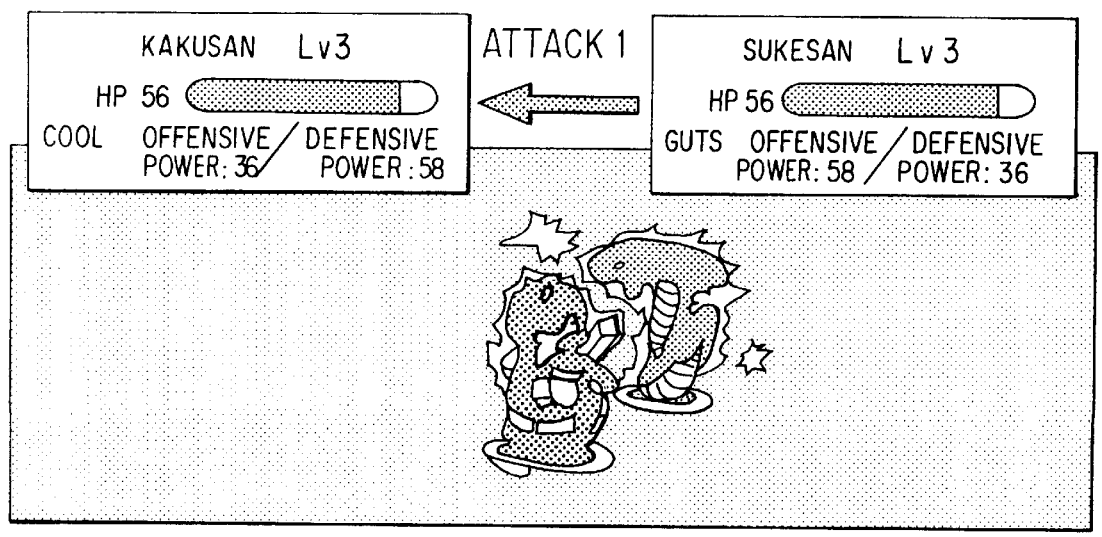

After determining the action, an image corresponding to the determined action is displayed (step S509). For example, if the "move" action is selected, an animation representing a scene in which the piece moves is displayed as illustrated in FIG. 29A. If the "attack" action is selected, an animation representing a scene in which the piece attacks the other piece disposed in an adjacent square is displayed as shown in FIG. 29B.

After this, the CPU 11 estimates the effect brought by the action of the piece (step S510), and displays the result thereof (step S511). For example, the CPU 11 calculates how the opponent piece is damaged by the attack of the piece in accordance with a predetermined conditional expression, and displays the result of the calculation. The display of the result may be performed such that the piece suffering the damage exceeding a predetermined level disappears from the image.

Then, the CPU 11 judges whether or not the battle is concluded due to the result of the action (step S512). If it is not concluded, the offense and the defense are turned (step S513), and then the process returns to the step S508 of FIG. 24. The battle may be concluded when the five pieces except the "golden capsule" disappear in the play field due to the attack from the opponent, or the "golden capsule" is attacked for predetermined number of times. When the condition of the conclusion of the battle, which is determined in advance, is fulfilled, the CPU 11 displays the result of the battle to the player (step S514) and performs a piece trade process (step S515). The piece trade process is performed as a penalty to the loser, and at least one part of the pieces owned by the loser is transferred to the winner. For example, in case that all of the pieces of the loser except the golden capsule disappear in the battle, the piece selected as the golden capsule is transferred to the winner. If the golden capsule is destroyed by the attack during the battle, the piece selected from those owned by the loser is transferred to the winner.

When the trade process is finished, the chess mode is ended and the process returns to the step S8 of FIG. 2. If the "option" is selected in the procedure of FIG. 2, the CPU 11 executes the same process as that at the step S155 of FIG. 7.

In the above mentioned embodiment, the data defining the feature of the monster and the data defining the property of the piece are separated from each other and stored in the different sections in the main memory 13, respectively.

However, the present invention is not limited to such an embodiment. One part of the data (for example the data of the name) may be commonly used in both of the breeding mode and the chess mode, and the common data may be separately stored from the proper data for each of the breeding mode and the chess mode.

In the above mentioned embodiment, the CPU 11 works as various devices necessary for processing the game by being combined with a particular software, however, a part or all of the devices can be replaced with a logical circuit.

What is claimed is:

1. A game system comprising:
   an image display device;
   an operation input device for issuing a signal corresponding to an operation of a player;
   a mode select device for selecting, in response to operation of the operation input device, one of a breeding mode in which a breeding game is executed and a competition mode in which a competition game is executed;
   a breeding game control device, responsive to operation of the operation input device, for controlling execution of the breeding game to effect:
      production of a breeding game image including a game character in a scene in which game character is bred in response to a breeding operation performed by the player on the operation input device; and
      production of data defining a feature of the game character which is changed in accordance with a predetermined condition; and
   a competition game control device, responsive to operation of the operation input device, for controlling execution of the competition game to effect:
      production of a competition game image representing a scene of a competition wherein the player and an opponent each receive at least one game piece and control the at least one game piece to perform action on a predetermined play field during alternating turns of the player and the opponent; and
      determination of superiority and inferiority of the competition based on the action at each turn and data defining a property of said at least one game piece, wherein the data defining the feature of the game character and the data defining the property of said at least one game piece of the player are associated with each other.

2. The game system according to claim 1, further comprising a game piece registration device for performing a game piece registration process in which the game character bred in the breeding game is registered as said at least one game piece in the competition game in accordance with an instruction of the player inputted through the operation input device wherein said game piece registration device prepares the data which defines the property of said at least one game piece based on the data defining the feature of the game character.

3. The game system according to claim 2, wherein a plurality of game pieces is provided as said at least one game piece, at least one of the game pieces registered through the game piece registration process can be changed so as to be disabled from being selected by the player in the competition game in accordance with the progress of the competition game after being registered, and the game system further comprises a game piece information indication device for providing the player with information associated with the game pieces having experience of being registered selectively in accordance with the operation of the player.

4. The game system according to claim 3, wherein the game piece information indication device displays an appearance of the game character, which has experience of being registered as one of the game pieces, as the information associated with the game pieces on the image display device.

5. The game system according to claim 1, further comprising;
   a plurality of portable auxiliary storage devices; and
   a data recording device capable of recording data which defines the property of said at least one game piece on each of the portable auxiliary storage devices in accordance with signals inputted through the operation input device,
   wherein the competition game control device reads out the data recorded on each of the auxiliary storage devices, and sets the property of said at least one game piece given to each of the player and the opponent based on the data read out from each of the auxiliary storage devices.

6. The game system according to claim 1, wherein the breeding game control device sets a breeding environment as a factor affecting the feature of the game character in accordance with a setting operation performed by the player on the operation input device, displays the breeding game image such that an image corresponding to the breeding environment appears therein, and prepares the data defining the feature of the game character in accordance with the predetermined condition which is adjusted in association with the breeding environment.

7. The game system according to claim 6, wherein the breeding game control device changes the breeding environment in accordance with a changing command issued from the player through the operation input device after a beginning of a breeding of the game character.

8. The game system according to claim 6, wherein a plurality of images of breeding fields is prepared to represent the image corresponding to the breeding environment, and the breeding game control device displays the breeding game image such that one of the breeding field images corresponding to the breeding environment appears therein together with an image of the game character.

9. The game system according to claim 6, wherein the breeding game control device sets a breeding environment based on both of base information and item information, each of which is adjusted in accordance with instructions of the player inputted through the operation input device, and displays an image of a breeding field as the image corresponding to the breeding environment, the image of the breeding environment comprising a configuration determined in association with a base information and an item determined in association with the item information and arranged on the configuration.

10. The game system according to claim 1, wherein the breeding game control device can simultaneously set plural breeding environments in accordance with respective setting operations performed by the player on the operation input device, and can display images of breeding fields corresponding to the respective breeding environments, each of the images of the breeding fields being displayed with an image of the game character bred therein, and wherein the breeding game control device prepares the data which defines the feature of the game character in accordance with the predetermined condition, the condition being adjusted such that each of the breeding environments affects the feature of the game character displayed in each of the images of the breeding fields.

11. The game system according to claim 10, wherein the breeding game control device displays on the screen of the image display device a scene in which at least two images of the breeding fields are combined with each other in accordance with a combination request of the player inputted through the operation input device, and adjusts the data which defines the feature of the game character associated with each of said at least two images of the breeding fields in accordance with the predetermined condition, the condition being adjusted such that the feature of the game character is affected by combination of the breeding fields.

12. The game system according to claim 11, wherein the breeding game control device displays, on the image display device, a scene in which said at least two images of the breeding fields are separated from each other in accordance with a separation request of the player inputted through the operation input device, and adjusts the data which defines the feature of the game character associated with each of said at least two images of the breeding fields in accordance with the predetermined condition, the condition being adjusted such that the feature of the game character is affected by separation of the breeding fields.

13. The game system according to claim 1, wherein the breeding game control device displays, on the image display device, a scene in which the game character evolves when it is judged that a predetermined evolution time has come based on lapsed time in the breeding game, and adjusts the data of the game character in accordance with the predetermined condition which is affected by a detail of an evolution of the game character.

14. The game system comprising:
   an image display device;
   an operation input device for issuing a signal corresponding to an operation of a player;
   a mode select device for selecting, in response to operation of the operation input device; one of a breeding mode in which a breeding game is executed and a competition mode in which a competition game is executed;
   a breeding game control device, responsive to operation of the operation input device, for controlling execution of the breeding game to effect:
      production of a breeding game image including a game character in a scene in which game character is bred in response to a breeding operation performed by the player on the operation input device; and
      production of data defining a feature of the game character which is changed in accordance with a predetermined condition; and
   a competition game control device, responsive to operation of the operation input device, for controlling execution of the competition game to effect:
      production of a competition game image representing a scene of a competition wherein the player and an opponent each receive at least one game piece and control the at least one game piece to perform action on a predetermined play field during alternating turns of the player and the opponent;
      determination of superiority and inferiority of the competition based on the action at each turn and data defining a property of said at least one game piece, wherein the data defining the feature of the game character and the data defining the property of said at least one game piece of the player are associated with each other;
      formation of an image of the play field so as to include a plurality of squares arranged to form a series thereof, at least one of the squares having a configuration different from configurations of other squares; and
      progression of the competition game such that at least one of the action and the superiority and inferiority of the competition is affected with the configuration of each of the squares.

15. A data storage device readable by a computer which stores an executable game program for the computer to execute steps of:
   selecting, in accordance with an instruction of a player, one of a breeding mode in which a breeding game is executed and a competition mode in which a competition game is executed;
   controlling, in accordance with an instruction of a player, execution of the breeding game to effect:
      production of a breeding game image including a game character in a scene in which game character is bred in response to a breeding operation performed by the player; and
      production of data defining a feature of the game character which is changed in accordance with a predetermined condition;
   controlling, in accordance with an instruction of a player, execution of the competition game to effect:
      production of a competition game image representing a scene of a competition wherein the player and an opponent each receive at least one game piece and control the at least one game piece to perform action on a predetermined play field during alternating turns of the player and the opponent;
      determination of superiority and inferiority of the competition based on the action at each turn and data defining a property of said at least one game piece; and
   association of the data defining the feature of the game character and the data defining the property of said at least one game piece of the player with each other.

* * * * *